(12) United States Patent
Inoue

(10) Patent No.: US 6,469,455 B1
(45) Date of Patent: Oct. 22, 2002

(54) LIGHTING EMITTING ELEMENT DRIVING CIRCUIT

(75) Inventor: Tadao Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 15 days.

(21) Appl. No.: 09/712,857

(22) Filed: Nov. 15, 2000

(30) Foreign Application Priority Data

Nov. 15, 1999 (JP) ............................................. 11-323617

(51) Int. Cl.[7] ................................................ H05B 41/36
(52) U.S. Cl. ..................... 315/291; 315/169.3; 315/226; 345/76
(58) Field of Search ................................. 315/291, 307, 315/226, 169.1, 169.3, 169.2, 169.4, 205, 241 P, 209 R; 345/76, 53, 94, 77, 78, 82

(56) References Cited

U.S. PATENT DOCUMENTS

| | | | | |
|---|---|---|---|---|
| 5,442,260 A | * | 8/1995 | Saito et al. | 315/200 A |
| 5,608,339 A | * | 3/1997 | Fujiwara | 326/27 |
| 5,793,163 A | * | 8/1998 | Okuda | 315/169.2 |
| 5,886,475 A | * | 3/1999 | Horiuchi et al. | 315/169.3 |
| 6,049,175 A | * | 4/2000 | Forsberg | 315/200 A |
| 6,323,851 B1 | * | 11/2001 | Nakanishi | 345/204 |

FOREIGN PATENT DOCUMENTS

JP          6-73713          10/1994

* cited by examiner

*Primary Examiner*—Haissa Philogene
*Assistant Examiner*—Ephrem Alemu
(74) *Attorney, Agent, or Firm*—Katten Muchin Zavis Rosenman

(57) ABSTRACT

A light emitting element driving circuit for high speed modulation includes an electric current source for generating a constant electric current for driving a light emitting element and an electric current switch for switching a portion of a path for an electric current flowing into the electric current source to one of a path including the light emitting element and another path excluding the light emitting element, in accordance with a data signal. The driving circuit further includes a capacitor that is charged by the application of a supply voltage to thereby boost the supply voltage, and a boost switching part. The boost switching part switches another portion of the path for an electric current flowing into the electric current source to one of a path for charging the capacitor and another path for applying the supply voltage boosted by the capacitor to the light emitting element, in accordance with a control signal corresponding to the data signal.

8 Claims, 20 Drawing Sheets

LIGHTING EMITTING ELEMENT DRIVING CIRCUIT

BACKGROUND OF THE INVENTION

1. Field of the Invention

The present invention relates to a circuit for driving a light emitting element such as a semiconductor laser and light emitting diode used in, for example, the field of optical communications and the like, and particularly to a light emitting element driving circuit capable of driving such an element at a low voltage and at a high speed.

2. Description of the Related Art

In a light transmitting part such as in an optical transmission apparatus adopting a light emitting element, there is provided a light emitting element driving circuit for converting data of electrical signals to be transmitted into optical signals. Also, in an information-processing equipment such as an optical disk apparatus and a laser printer having light emitting elements, there is provided a light emitting element driving circuit similarly to the optical transmission apparatus.

FIG. 22 shows an exemplary general constitution of a light emitting element driving circuit such as for high-speed optical communications.

In the circuitry shown in FIG. 22, there are provided an electric current source 1, a light emitting element 2 and a differential type electric current switch 3, between a terminal applied with a supply voltage VDD and a ground terminal, in which a path of a constant current generated by the electric current source 1 is switchedly controlled by the current switch 3 in accordance with a transmission data signal DATA and a reversed transmission data signal XDATA so as to drive the light emitting element 2.

As the current source 1 to be used here, it is typical to adopt such as a current mirror circuit which utilizes a plurality of transistors.

Meanwhile, supply voltages for recent digital CMOS-LSI's used in various information/communications related equipments have been lowered corresponding to the demand of decreased power consumption and high-precision processing. As such, supply voltages have been presently lowered to the order of 2.5 V to 1 V. Such advancement of lower supply voltages of various equipments leads to supply voltages lower than those required for driving light emitting elements, thereby requiring a countermeasure such as to boost supply voltages.

Conventional light emitting element driving circuits where boosting of supply voltages is performed include one disclosed in Japanese Unexamined Utility Model Publication No. 6-73713. This conventional driving circuit is constituted to drive a light emitting element such as for a camera at a voltage higher than a supply voltage, by charging and discharging a capacitor. Further, the switching element for driving the light emitting element is commonized with that for a known bridge circuit for driving a motor so as to electrically separate the driving circuit of the light emitting element from other circuits constituting the system of camera, to thereby contemplate downsizing the system of camera as a whole and improving reliability.

Although the aforementioned conventional light emitting element driving circuit may be sufficient to cope with a lowered supply voltage, such a circuit is problematic as one for optical communications where a stable high speed modulation is required.

Namely, in the light emitting element driving circuit for high-speed optical communications as mentioned above, the current source 1 is provided to supply a stable and constant driving current to the light emitting element 2, and there is frequently used a current mirror circuit adopting a plurality of transistors as the current source 1. Since the transistors in such a current mirror circuit have parasitic capacitances, the direct modulation of the light emitting element 2 by using the current mirror circuit as the current source 1 leads to a transiently unstable value of a driving current for the light emitting element 2 during the flow of charging and discharging currents into and from the aforementioned parasitic capacitances, resulting in difficulty of the high speed modulation. To stably conduct the high speed modulation, it is necessary to control the operation of the current source 1 corresponding to the driving state of the light emitting element 2 simultaneously with the controlling of charging and discharging of the capacitor.

SUMMARY OF THE INVENTION

The present invention has been carried out in view of the conventional problems as described above, and it is therefore an object of the present invention to provide a light emitting element driving circuit for optical communications, capable of coping with a lowered supply voltage and of realizing a stable high speed modulation.

To achieve the above object, the present invention provides a light emitting element driving circuit for driving a light emitting element by a constant electric current generated by an electric current source, comprising: a first switching part for switching a portion of a path for an electric current flowing into the electric current source, to one of a light emission path including the light emitting element and a light extinction path excluding the light emitting element, in accordance with a data signal for determining whether the light emitting element is to be driven for light emission; a supply voltage boosting part for boosting a supply voltage based on a charge accumulated by the supply of the supply voltage; a second switching part for switching another portion of the path for an electric current flowing into the electric current source, to one of a charging path for charging the supply voltage boosting part and a boosting path for applying the supply voltage boosted by the supply voltage boosting part to the light emitting element, in accordance with a control signal corresponding to the data signal.

According to such a constitution, the first switching part and the second switching part operate in accordance with the data signal and the control signal, respectively, to thereby switch the paths for an electric current flowing into the electric current source corresponding to the driving state (light emission or light extinction) of the light emitting element, so that the supply voltage boosted by the supply voltage boosting part is applied to the light emitting element to thereby drive the same. At this time, the electric current paths to be switched pass through the electric current source irrespectively of the driving state of the light emitting element, to thereby continuously keep the electric current source in an operating state. This enables a stable high speed modulation of the light emitting element.

Concerning the light emitting element driving circuit, constitution may be such that the supply voltage boosting part includes a capacitor having a first terminal and a second terminal; and when the switching to the charging path is conducted, the second switching part applies the supply voltage to the first terminal of the capacitor and connects the second terminal of the capacitor to a path leading to the electric current source, and when the switching to the boosting path is conducted, the second switching part applies the supply voltage to the second terminal of the capacitor and connects the first terminal of the capacitor to the light emitting element.

According to such a constitution, the switching between charging and discharging (boosting) is conducted by the second switching part in accordance with the control signal, and the supply voltage is boosted by the charge accumulated in the capacitor to be supplied to the light emitting element.

As a concrete constitution of the light emitting element driving circuit, it is possible that the control signal is common to the data signal; when the data signal is at a logic to bring the light emitting element into a light extinction state, the switching operations of the first switching part and the second switching part are to form a path of an electric current flowing through: the first terminal of the capacitor applied with the supply voltage; the second terminal of the capacitor; and the electric current source; in this order, to thereby charge the capacitor; and when the data signal is at a logic to bring the light emitting element into a light emission state, the switching operations of the first switching part and the second switching part are to form a path of an electric current flowing through the second terminal of the capacitor applied with the supply voltage, the first terminal of the capacitor, the light emitting element and the electric current source, in this order, to thereby drive the light emitting element by the boosted supply voltage.

According to such a constitution, the first and second switching parts are switched in accordance with the data signal, respectively, such that the capacitor is charged when the light emitting element is to be brought into a light extinction state and such that the voltage boosted by the capacitor is applied to the light emitting element when the light emitting element is to be brought into a light emission state.

As another concrete constitution of the light emitting element driving circuit, it is possible that the control signal is a cell signal indicative of whether the data signal is at an intracellular timing including logics for bringing the light emitting element into a light emission state or at an extracellular timing; when the cell signal is at a logic indicative of an extracellular timing, the switching operations of the first switching part and the second switching part are to form a path of an electric current flowing through the first terminal of the capacitor applied with the supply voltage, the second terminal of the capacitor and the electric current source, in this order, to thereby charge the capacitor; and when the cell signal is at a logic indicative of an intracellular timing and the data signal is at a logic to bring the light emitting element into a light emission state, the switching operations of the first switching part and the second switching part are to form a path of an electric current flowing through the second terminal of the capacitor applied with the supply voltage, the first terminal of the capacitor, the light emitting element and the electric current source, in this order, to thereby drive the light emitting element by the boosted supply voltage.

According to such a constitution, the first switching part is switched in accordance with the data signal and the second switching part is switched in accordance with the cell signal, so that the capacitor is charged at the extracellular timing where the light emitting element is not brought into a light emission state. Further, when the light emitting element is to emit light at the intracellular timing, the voltage boosted by the capacitor is applied to the light emitting element.

Further, it is preferable for the light emitting element driving circuit that when the cell signal is at a logic indicative of an intracellular timing and the data signal is at a logic to bring the light emitting element into a light extinction state, the switching operations of the first switching part and the second switching part form a path of an electric current excluding the capacitor and the light emitting element.

According to such a constitution, there can be formed the electric current path to avoid useless consumption of the charge accumulated in the capacitor, when the light emitting element is to extinguish light at the intracellular timing.

Further, concerning the aforementioned light emitting element driving circuit, this circuit may comprise a data detecting part for detecting whether the data signal within a finite length includes a logic to bring the light emitting element into a light emission state and the detection result of the data detecting part may be used as the cell signal.

According to such a constitution, it is detected, at the data detecting part, whether a logic to bring the light emitting element into a light emission state exists in the data signal within the finite length, and a signal corresponding to the cell signal is generated within the light emitting element driving circuit.

In addition, concerning the aforementioned light emitting element driving circuit, it is possible that: the control signal comprises a signal based on a clock signal synchronized with the data signal and the cell signal; the light emitting element driving circuit further comprises a rectifying part for rectifying the supply voltage boosted by the capacitor and for applying the thus boosted supply voltage to the light emitting element; when the cell signal is at a logic indicative of an extracellular timing and the signal based on the clock signal is at one of two indicatable logics, the switching operations of the first switching part and the second switching part are to form a path of an electric current flowing through the first terminal of the capacitor applied with the supply voltage, the second terminal of the capacitor and the electric current source, in this order, to thereby charge the capacitor; when the cell signal is at a logic indicative of an extracellular timing and the signal based on the clock signal is at the other of two indicatable logics, the switching operations of the first switching part and the second switching part are to form a path of an electric current flowing through the second terminal of the capacitor applied with the supply voltage, the first terminal of the capacitor and the rectifying part, in this order; and when the cell signal is at a logic indicative of an intracellular timing and the data signal is at a logic to bring the light emitting element into a light emission state, the switching operations of the first switching part and the second switching part are to form a path of an electric current flowing through the rectifying part, the light emitting element and the electric current source in this order, to thereby drive the light emitting element by the voltage rectified by the rectifying part.

According to such a constitution, the charging and discharging of the capacitor at the extracellular timing is conducted in accordance with the signal (clock signal, or a signal obtained by dividing the clock signal) based on the clock signal; and when the light emitting element is to be brought into a light emission state at the intracellular timing, the voltage boosted by the capacitor and rectified by the rectifying part is applied to the light emitting element.

Further, the aforementioned light emitting element driving circuit may further comprise: a sequence controlling part for controlling the operation of the second switching part such that the supply voltage to the supply voltage boosting part is momentarily interrupted when switching between the charging path and the boosting path at the second switching part.

According to such a constitution, the operation of the second switching part is sequence controlled by the sequence controlling part when switching between the charging path and boosting path, so as to prevent the supply voltage boosting part from entering a short-circuited condition. This eliminates unnecessary discharge at the supply voltage boosting part, and enables avoidance of deterioration of the voltage transforming efficiency.

Other objects, features and advantages of the present invention will become more apparent from the following description of preferred embodiments when read in conjunction with the accompanying drawings.

DETAILED DESCRIPTION OF THE PREFERRED EMBODIMENT

There will be described hereinafter embodiments according the present invention, with reference to the accompanying drawings.

There will be firstly described herein an overview of the basic constitution and operation of the light emitting element driving circuit according to the present invention, and thereafter the concrete embodiments will be detailed.

Figure 1:
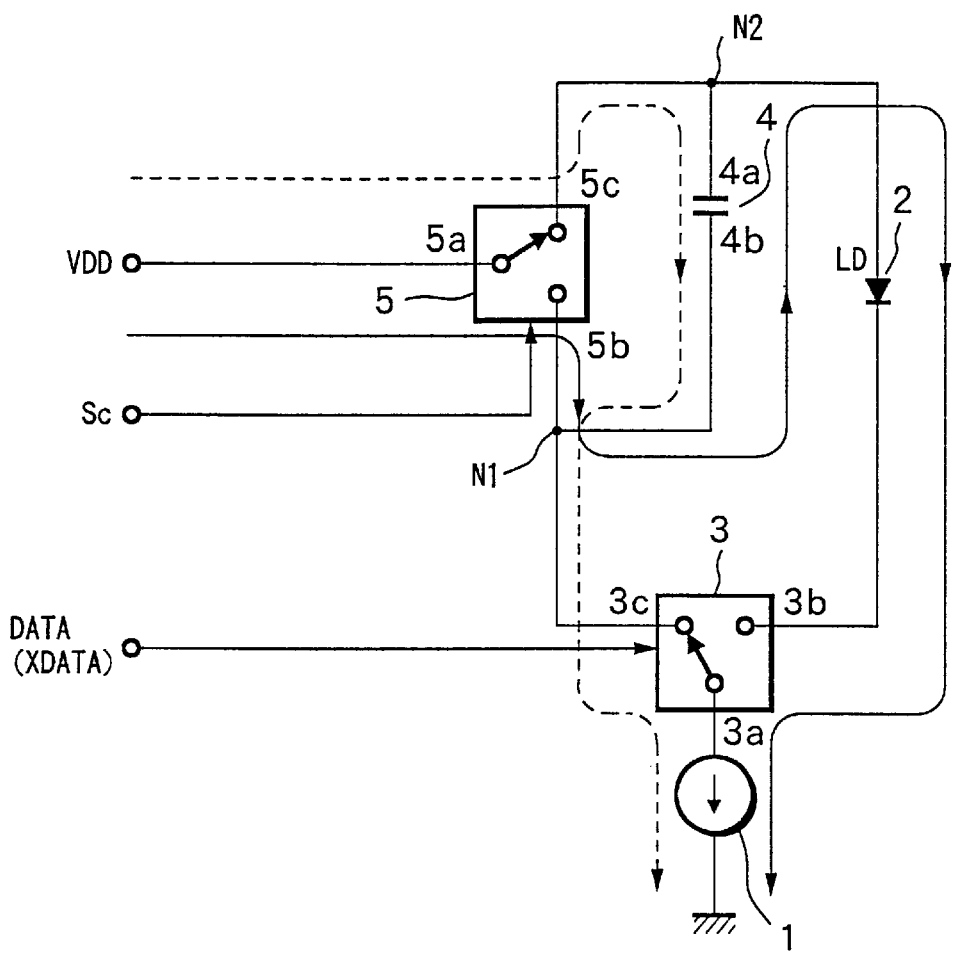
FIG. 1 is a view showing a basic constitution of a light emitting element driving circuit according to the present invention.

FIG. 1 is a view showing a basic constitution of a light emitting element driving circuit according to the present invention.

In FIG. 1, the basic constitution of this light emitting element driving circuit includes an electric current source 1, a light emitting element 2, a current switch 3 as a first switching part, a capacitor 4 as a supply voltage boosting part and a boosting switch 5 as a second switching part.

Figure 2:
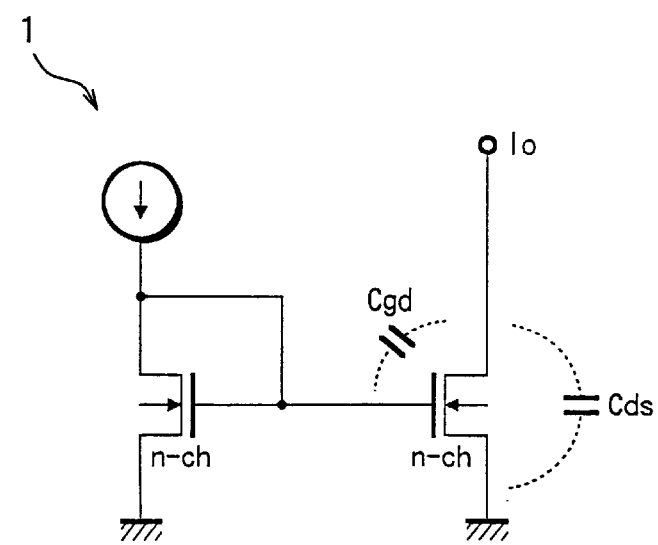
FIG. 2 is a view showing an exemplary constitution of an electric current source to be used in the circuit of FIG. 1.

The current source 1 is a known one for generating a driving current for the light emitting element 2, and constituted of a current mirror circuit such as shown in FIG. 2. The circuitry of FIG. 2 is a general current mirror circuit of a single stage constitution adopting two n-channel MOSFET's. In this driving circuit, the current mirror circuit has an output terminal 1o connected to a terminal 3a of the current switch 3. The concrete circuitry of the current source 1 is not limited thereto. In such a current mirror circuit, parasitic capacitances Cgd, Cds are formed between terminals of the MOSFET's, and such parasitic capacitances Cgd, Cds have disturbed a high-speed operation of a conventional driving circuit.

For example, there is used a semiconductor laser (laser diode, hereinafter called "LD") as the light emitting element 2, and the LD has a cathode terminal connected to a terminal 3b of the current switch 3. Although the light emitting element 2 is constituted of the LD herein, the element 2 may be constituted of a light emitting diode (LED), for example, in the driving circuit according to the present invention.

The current switch 3 is adapted to switch its connecting state from between the terminal 3a and the terminal 3b to between the terminal 3a and a terminal 3c, and vice versa, in accordance with a transmission data signal DATA or a reversed data signal XDATA, in which the terminals 3a, 3b and 3c are connected to the current source 1, light emitting element 2 and capacitor 4, respectively.

The capacitor 4 has a terminal 4a (first terminal) connected to an anode terminal of the light emitting element 2 and to a terminal 5c of the boosting switch 5, and another terminal 4b (second terminal) connected to the terminal 3c of the current switch 3 and to a terminal 5b of the boosting switch 5. This capacitor 4 accumulates a charge for boosting the supply voltage VDD.

The boosting switch 5 is adapted to switch its connecting state from between a terminal 5a and the discharging side terminal 5b to between the terminal 5a and a charging side terminal 5c, and vice versa, in accordance with a control signal Sc, in which the terminal 5a is applied with the supply voltage VDD, and the terminals 5b and 5c are connected to the terminals 4b and 4a of the capacitor 4, respectively. The supply voltage VDD is a DC voltage having a predetermined value supplied from such as an external power source, and this voltage value is set to be on the order of 1 V, for example, by the lowered supply voltage. Further, the control signal Sc has a level to be changed corresponding to the data signal DATA, and the concrete waveform of the signal Sc will be detailed in the embodiments to be described later. The description hereafter will be conducted by assuming that a signal identical with the data signal DATA is used as the control signal Sc.

In the light emitting element driving circuit having the aforementioned basic constitution, in the state where the supply voltage VDD from the outside is supplied to the terminal 5a of the boosting switch 5, the electric current path of the circuit is switched corresponding to the driving state (light emission and light extinction) of the light emitting element 2, to thereby boost the supply voltage VDD.

Figure 3:
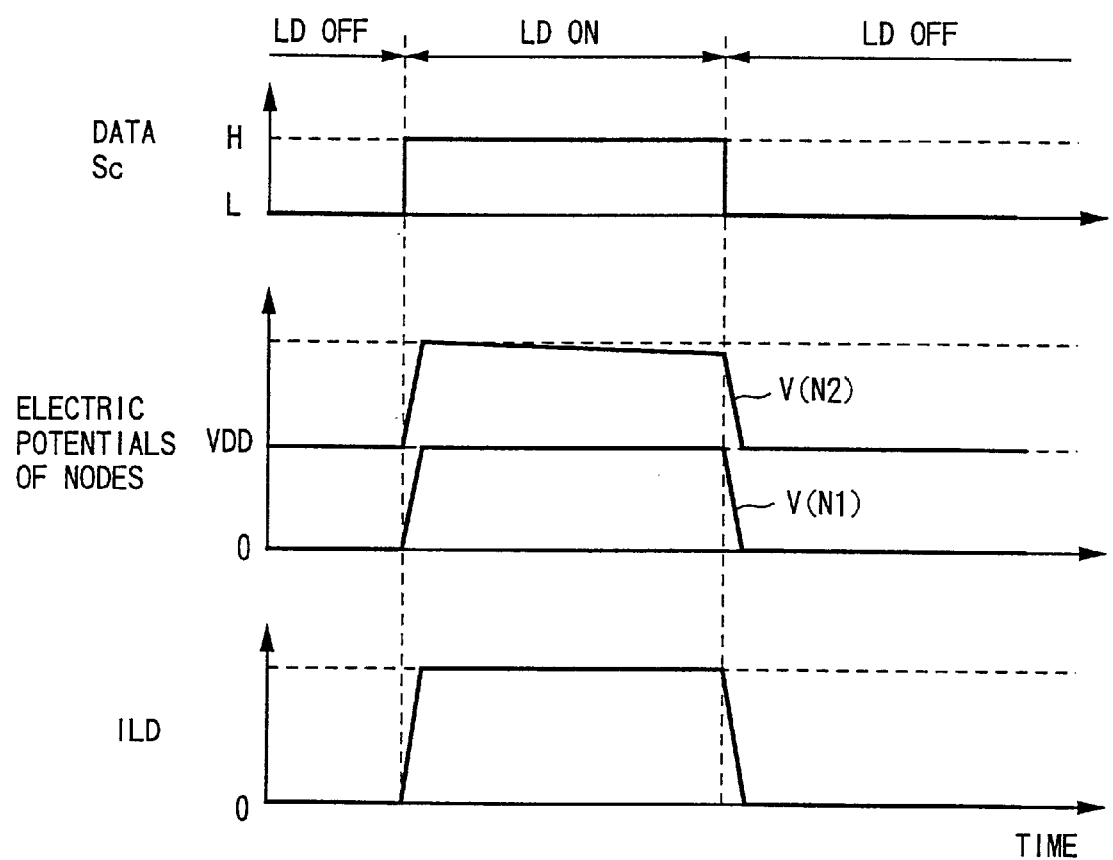
FIG. 3 is a time chart explaining a basic operation of the light emitting element driving circuit according to the present invention.

Concretely as shown in the time chart of FIG. 3, the data signal DATA (upper row) is brought into a LOW level to be sent to the current switch 3, so as to firstly bring the light emitting element 2 into a light extinction state (LD_OFF). The control signal Sc is also brought into a LOW level similarly to the data signal DATA, to be sent to the boosting switch 5.

In the current switch 3, the terminal 3a connected to the current source 1 is connected to the terminal 3c at the light extinction side, upon receiving the data signal DATA at the LOW level. Simultaneously therewith, at the boosting switch 5, the terminal 5a applied with the supply voltage VDD is connected to the terminal 5c at the charging side, upon receiving the control signal Sc at the LOW level. This results in a constant electric current through the boosting switch 5, node N2, capacitor 4, node N1, current switch 3 and current source 1 in this order as depicted by an arrow headed broken line in FIG. 1, to thereby charge the capacitor 4. At this time as shown in the middle row of FIG. 3, the electric potential V(N1) of the node N1 (terminal 4b of the capacitor 4) becomes equal to about 0 V (grounded level), and the electric potential V(N2) of the node N2 (terminal 4a of the capacitor 4) becomes equal to the supply voltage VDD. Further, as shown in the lower row of FIG. 3, since the light emitting element 2 is not supplied with a driving current ILD, this element 2 is brought into the light extinction state. Note, even during the charging of the capacitor 4 in the aforementioned manner, an electric current flows into the current source 1, so that the current source 1 is allowed to keep a stable operation state capable of responding to an even high speed modulation.

When the light emitting element 2 is to be brought into a light emission state (LD_ON), the data signal DATA and control signal Sc become HIGH levels, respectively, so that, in the current switch 3, the terminal 3a is connected to the terminal 3b at the light emission side and, in the boosting switch 5, the terminal 5a is connected to the terminal 5b at the discharging side. This results in a constant electric current through the boosting switch 5, node N1, capacitor 4, node N2, light emitting element 2, current switch 3 and current source 1 in this order as depicted by an arrow headed solid line in FIG. 1. At this time, the electric potential V(N1) at the node N1 becomes equal to the supply voltage VDD, the electric potential V(N2) at the node N2 becomes equal to a high voltage of about two times as large as the supply voltage VDD, which voltage is obtained by adding the interterminal voltage of the capacitor 4 to the supply voltage VDD. The thus boosted high voltage is applied to the light emitting element 2 to render the same to emit light. Note, the electric potential V(N2) at the node N2 during light emission gradually drops, because the charge accumulated in the capacitor 4 is consumed by the light emission of the light emitting element 2. However, since the driving current ILD to be supplied to the light emitting element 2 is controlled to be constant by the current source 1 as shown in the lower row of FIG. 3, the stable light emitting operation of the light emitting element 2 is ensured.

Further, when the light emitting element 2 is to be brought into a light extinction state (LD_OFF), the data signal DATA and control signal Sc become LOW levels, respectively, so that the electric current path is switched in the manner opposite to the above, to thereby charge the capacitor 4.

In this way, according to the light emitting element driving circuit of the present invention, the operations of the current switch 3 and boosting switch 5 are controlled in accordance with the data signal DATA and control signal Sc to thereby switch the electric current path, such that the capacitor 4 is charged by accumulating a charge thereinto at the timing of light extinction of the light emitting element 2 and the boosted supply voltage is applied to the light emitting element 2 at the timing of light emission of the element 2, thereby enabling realization of a countermeasure with a simple constitution to the lowered supply voltage. Further, the current source 1 is continuously operated by flowing the electric current into the current source 1 irrespectively of the light emission/extinction state of the light emitting element 2, to thereby reduce an unstable operation of the current source 1 due to the conventional parasitic capacitances. Thus, there can be realized the driving circuit capable of conducting the stable high speed modulation of the light emitting element 2.

There will be now described hereinafter concrete embodiments of a light emitting element driving circuit to which the aforementioned basic constitution is applied.

Figure 4:
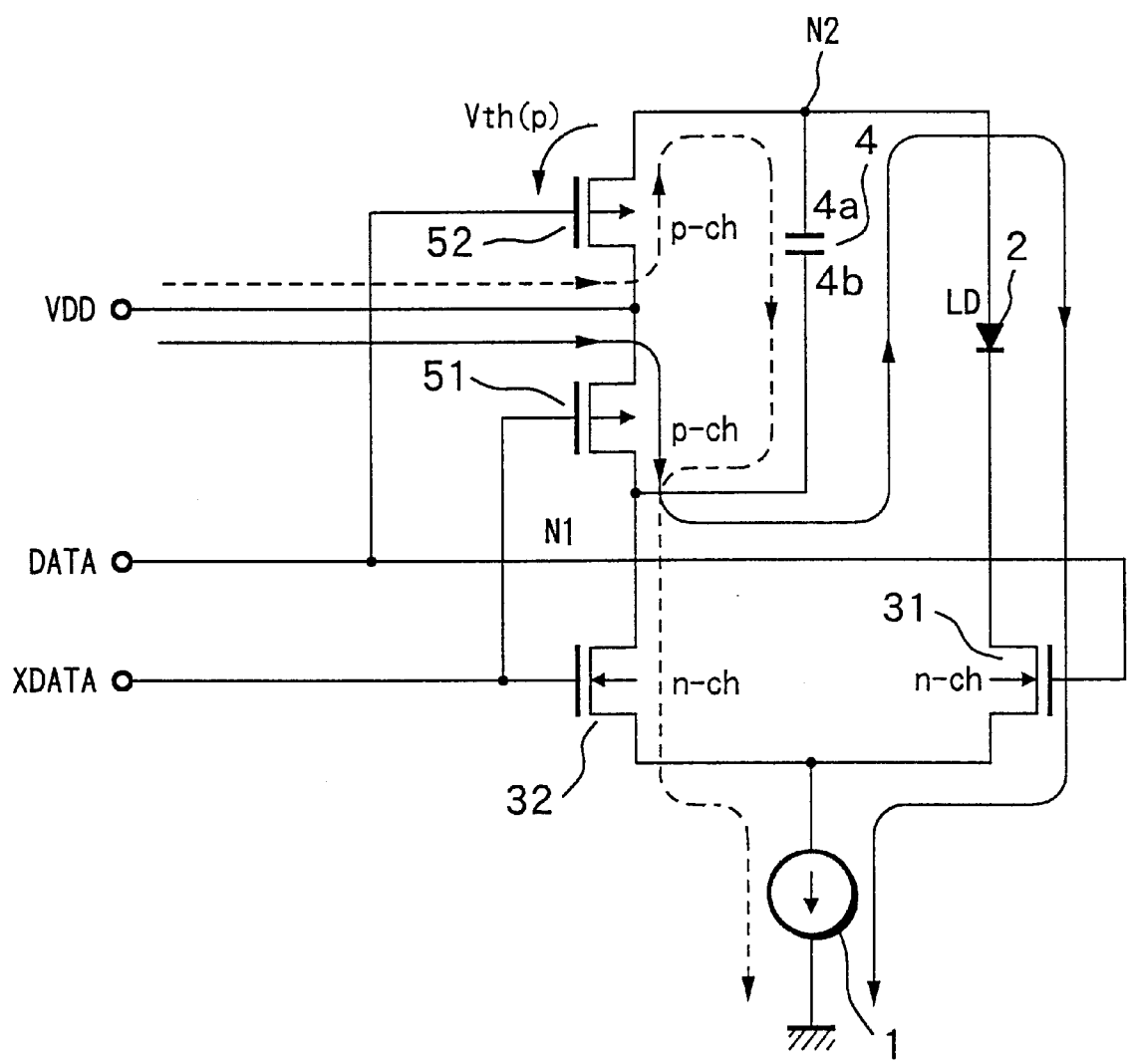
FIG. 4 is a view showing a light emitting element driving circuit according to a first embodiment of the present invention.
Figure 5:
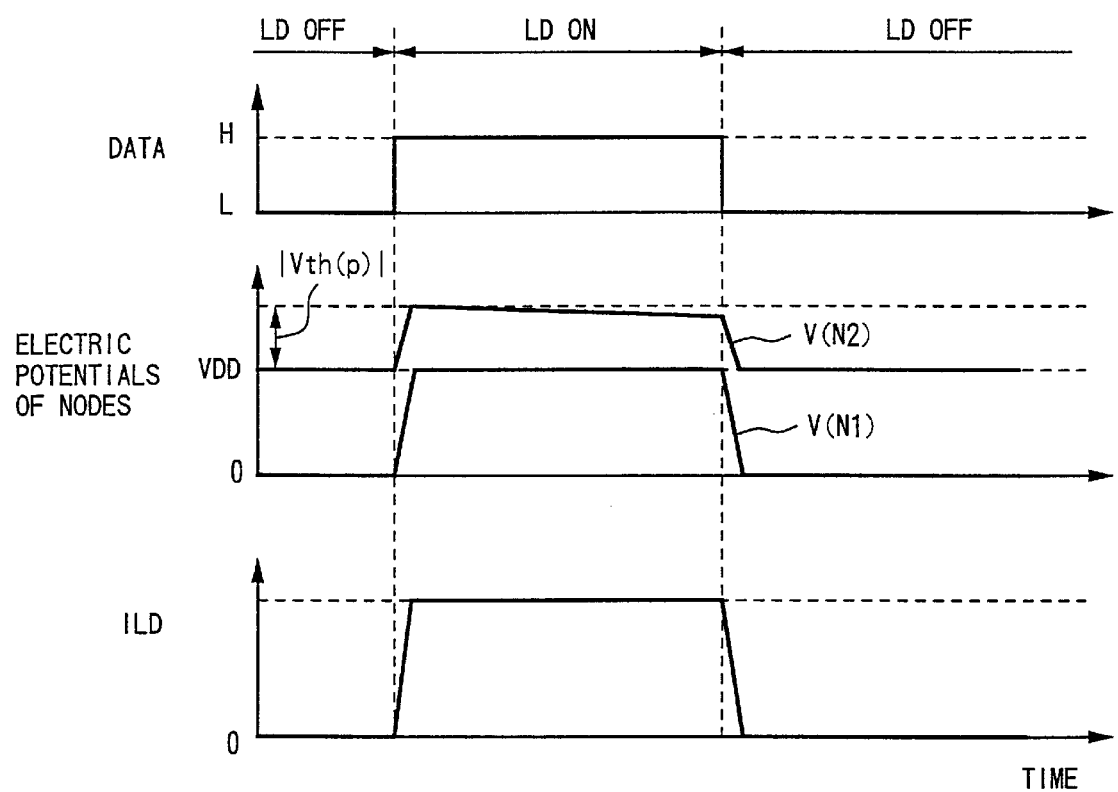
FIG. 5 is a time chart explaining the operation of the first embodiment.

FIG. 4 is a view showing a constitution of a light emitting element driving circuit according to a first embodiment of the present invention.

The light emitting element driving circuit shown in FIG. 4 is provided based on the basic constitution shown in FIG. 1, such that the current switch 3 is constituted of two n-channel MOSFET's 31, 32, for example, the boosting switch 5 is constituted of two p-channel MOSFET's 51, 52, for example, and the operations of the current switch 3 and boosting switch 5 are duly controlled by the data signal DATA and reversed data signal XDATA. Note, the current source 1, light emitting element 2 and capacitor 4 are identical with those described in the aforementioned basic constitution.

The n-channel MOSFET 31 constituting the current switch 3 has a gate terminal applied with the data signal DATA, a drain terminal connected to a cathode terminal of the light emitting element 2, and a source terminal connected to the output terminal 1o of the current source 1. Further, the n-channel MOSFET 32 has a gate terminal applied with the reversed data signal XDATA, a drain terminal connected to the terminal 4b of the capacitor 4, and a source terminal connected to the output terminal 1o of the current source 1.

The p-channel MOSFET 51 constituting the boosting switch 5 has a gate terminal applied with the reversed data signal XDATA, a source terminal applied with the supply voltage VDD, and a drain terminal connected to the terminal 4b of the capacitor 4 and to the drain terminal of the n-channel MOSFET 32. Further, the p-channel MOSFET 52 has a gate terminal applied with the data signal DATA, a source terminal applied with the supply voltage VDD, and a drain terminal connected to the terminal 4a of the capacitor 4 and to the light emitting element 2.

It is concretely assumed here that an LD is used as the light emitting element 2, the capacitor 4 has such a capacity of about 100 nF, and the current source 1 is constituted of the aforementioned typical current mirror circuit as shown in FIG. 2. Further, the explanation will be conducted by assuming that the supply voltage VDD is 1.8V, and the data signal DATA and reversed data signal XDATA have differential LV-CMOS levels of Low=0V and High=1.8V.

In the aforementioned light emitting element driving circuit, when the light emitting element 2 is to be brought into a light extinction state, the data signal DATA at a LOW level (0V) is input into the gate terminals of the n-channel MOSFET 31 and p-channel MOSFET 52, and simultaneously therewith the reversed data signal XDATA at a HIGH level (1.8V) is input into the gate terminals of the n-channel MOSFET 32 and p-channel MOSFET 51. Thus, the n-channel MOSFET 32 and p-channel MOSFET 52 are turned on, and the n-channel MOSFET 31 and p-channel MOSFET 51 are turned off. This results in a constant electric current through the p-channel MOSFET 52, node N2, capacitor 4, node N1, n-channel MOSFET 32 and current source 1 in this order as depicted by an arrow headed broken line in FIG. 4, to thereby charge the capacitor 4.

When the light emitting element 2 is to be brought into a light emission state, the data signal DATA at a HIGH level is input into the gate terminals of the n-channel MOSFET 31 and p-channel MOSFET 52, and simultaneously therewith the reversed data signal XDATA at a LOW level is input into the gate terminals of the n-channel MOSFET 32 and p-channel MOSFET 51. Thus, the n-channel MOSFET 31 and p-channel MOSFET 51 are turned on, and the n-channel MOSFET 32 and p-channel MOSFET 52 are turned off. This results in a constant electric current through the p-channel MOSFET 51, node N1, capacitor 4, node N2, light emitting element 2, n-channel MOSFET 31 and current source 1 in this order as depicted by an arrow headed solid line in FIG. 4, so that the boosted electric potential V(N2) at the node N2 is applied to the light emitting element 2 to thereby bring this element 2 into the light emission state.

In the above, it is to be noted that the boosted voltage is limited by a threshold voltage Vth(p) of the p-channel MOSFET 52 of the boosting switch 5. Namely, when the electric potential V(N2) at the node N2 is boosted such that the voltage between the gate and drain of the p-channel MOSFET 52 becomes greater than the absolute value of the threshold voltage Vth(p), the p-channel MOSFET 52 is turned on so that the charge accumulated in the capacitor 4 is discharged via the p-channel MOSFET 52. As such, the boosted electric potential V(N2) at the node N2 which is to be applied to the light emitting element 2 is limited to a value of VDD (1.8V)+|Vth(p)|. Thus, the boosted electric potential V(N2) at the node N2 becomes 2.6V, in case of adopting the p-channel MOSFET 52 having its threshold voltage Vth(p) of 0.8V, for example.

According to the light emitting element driving circuit of the first embodiment, the current switch 3 and boosting switch 5 are constituted of MOSFET's, and the operations of respective MOSFET's are controlled in accordance with the data signal DATA and reversed data signal XDATA so as to switch the electric current path of the circuit to thereby conduct the charge and discharge of the capacitor 4. Thus, the supply voltage VDD can be boosted with a simple constitution, and the electric current is continuously flown into the current source 1 irrespectively of the light emission/extinction state of the light emitting element 2. This reduces the conventional unstable operation of the current source 1 due to charging and discharging of the capacitor 4, thereby enabling the stable high speed modulation of the light emitting element 2.

In the aforementioned first embodiment, the electric current switch and boosting switch have been constituted of MOSFET's. However, it is possible in the present invention to constitute the respective switches making use of known elements capable of performing switching operations, such as junction FET's and MESFET's.

Further, the circuitry parts in the light emitting element driving circuit of the present invention may be constituted of individual parts, or of a monolithic part such as a CMOS making use of semiconductor process. The same rule applies corresponding to the following embodiments.

Moreover, when the period of time of the light extinction state is excessively long in this embodiment, the current source 1 is stopped upon completion of charging of the capacitor 4. As such, the parasitic capacitances of the current source 1 are to be charged and discharged when subsequently switching to the light emission state, resulting in a possibility that the high speed modulation becomes difficult due to the unstable current flowing through the light emitting element 2. Thus, it is suitable to apply this embodiment to a system where the period of time of a light extinction state is duly restricted.

There will be now described a second embodiment of the present invention.

In the second embodiment, there will be explained an example of a light emitting element driving circuit suitable for a situation where the data transmission by an optical signal is conducted in a so-called burst transmission method.

Figure 6:
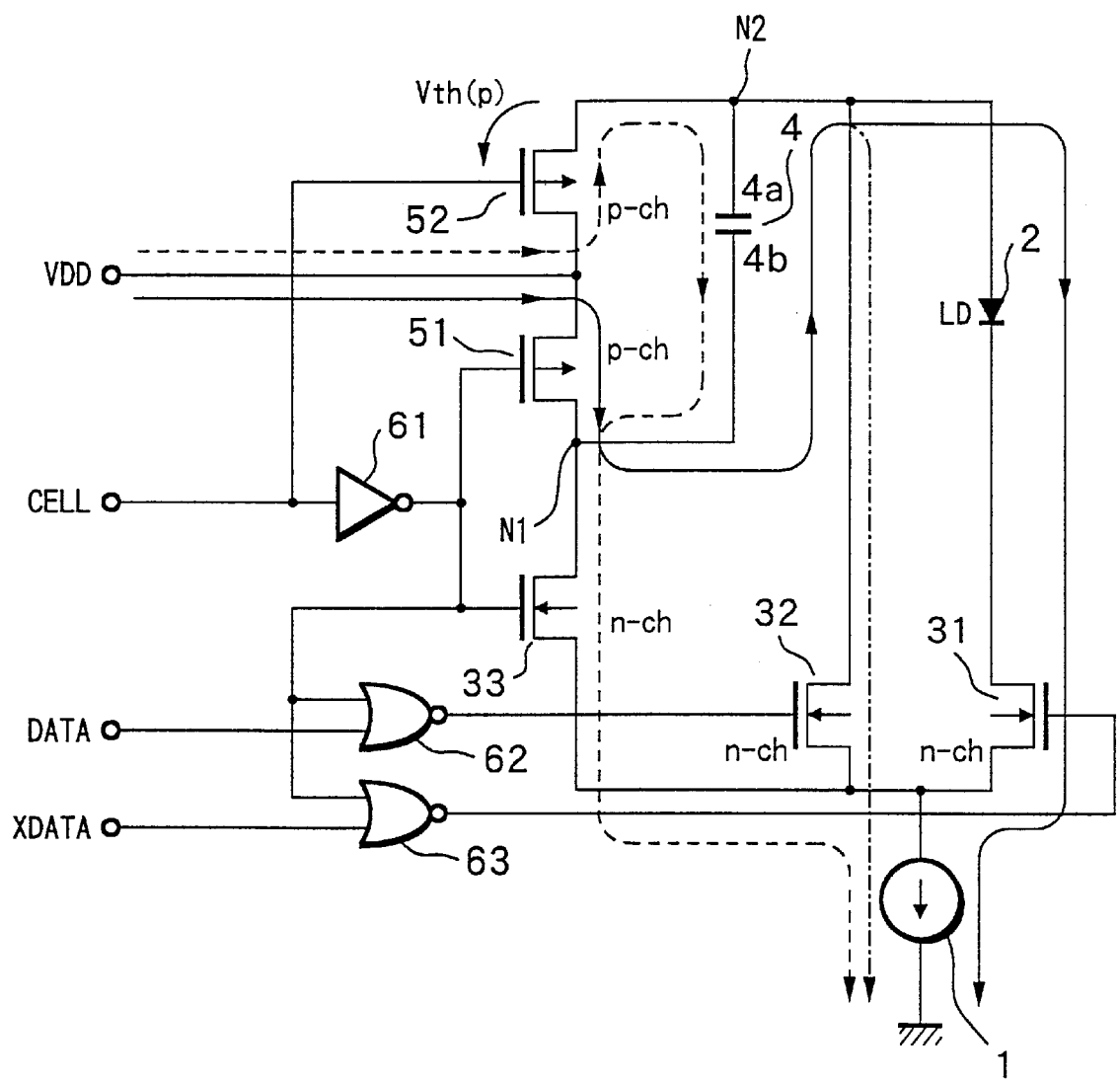
FIG. 6 is a view showing a light emitting element driving circuit according to a second embodiment of the present invention.

FIG. 6 is a view showing a constitution of a light emitting element driving circuit according to the second embodiment. Those parts identical with the constitution of the first embodiment are denoted by the same reference numerals, and the same rule applies corresponding to the following.

The light emitting element driving circuit shown in FIG. 6 is provided based on the basic constitution shown in FIG. 1, such that the current switch 3 is constituted of three n-channel MOSFET's 31, 32, 33, for example, the boosting switch 5 is constituted of two pieces of p-channel MOSFET's 51, 52, for example, and the operations of the current switch 3 and boosting switch 5 are duly controlled by the cell signal CELL, data signal DATA and reversed data signal XDATA. As shown in the uppermost row of FIG. 7, the cell signal is provided for identifying a timing including a cell containing burstedly generated data and a timing including no cells. Concretely, there shall be provided, such as from an external device, the cell signal CELL which becomes a HIGH level in the presence of data (intracellular) and a LOW level in the absence of data (extracellular). Note, the current source 1, light emitting element 2 and capacitor 4 are identical with those described in the aforementioned basic constitution.

The n-channel MOSFET 31 constituting the current switch 3 has a gate terminal input with an output signal from a NOR gate 63, a drain terminal connected to the cathode terminal of the light emitting element 2, and a source terminal connected to the output terminal 10 of the current source 1. The NOR gate 63 is input with the cell signal CELL inverted by an inverter 61, and with the reversed data signal XDATA. Further, the n-channel MOSFET 32 has a gate terminal input with an output signal from a NOR gate 62, a drain terminal connected to the node N2 (terminal 4a of the capacitor 4), and a source terminal connected to the output terminal 1o of the current source 1. The NOR gate 62 is input with the cell signal CELL inverted by the inverter 61, and with the data signal DATA. Moreover, the n-channel MOSFET 33 has a gate terminal input with the output signal from the inverter 61, a drain terminal connected to the node N1 (terminal 4b of the capacitor 4), and a source terminal connected to the output terminal 10 of the current source 1. The inverter 61 is input with the cell signal CELL.

The p-channel MOSFET 51 constituting the boosting switch 5 has a gate terminal input with the output signal from the inverter 61, a source terminal applied with the supply voltage VDD, and a drain terminal connected to the node N1. Further, the p-channel MOSFET 52 has a gate terminal input with the cell signal CELL, a source terminal applied with the supply voltage VDD, and a drain terminal connected to the node N2.

In the light emitting element driving circuit having the aforementioned constitution, the electric current path is switched such that: the capacitor 4 is charged at the extracellular timing in which burst data is not being generated; and the capacitor 4 is discharged irrespectively of the data level at the intracellular timing in which burst data is being generated.

Figure 7:
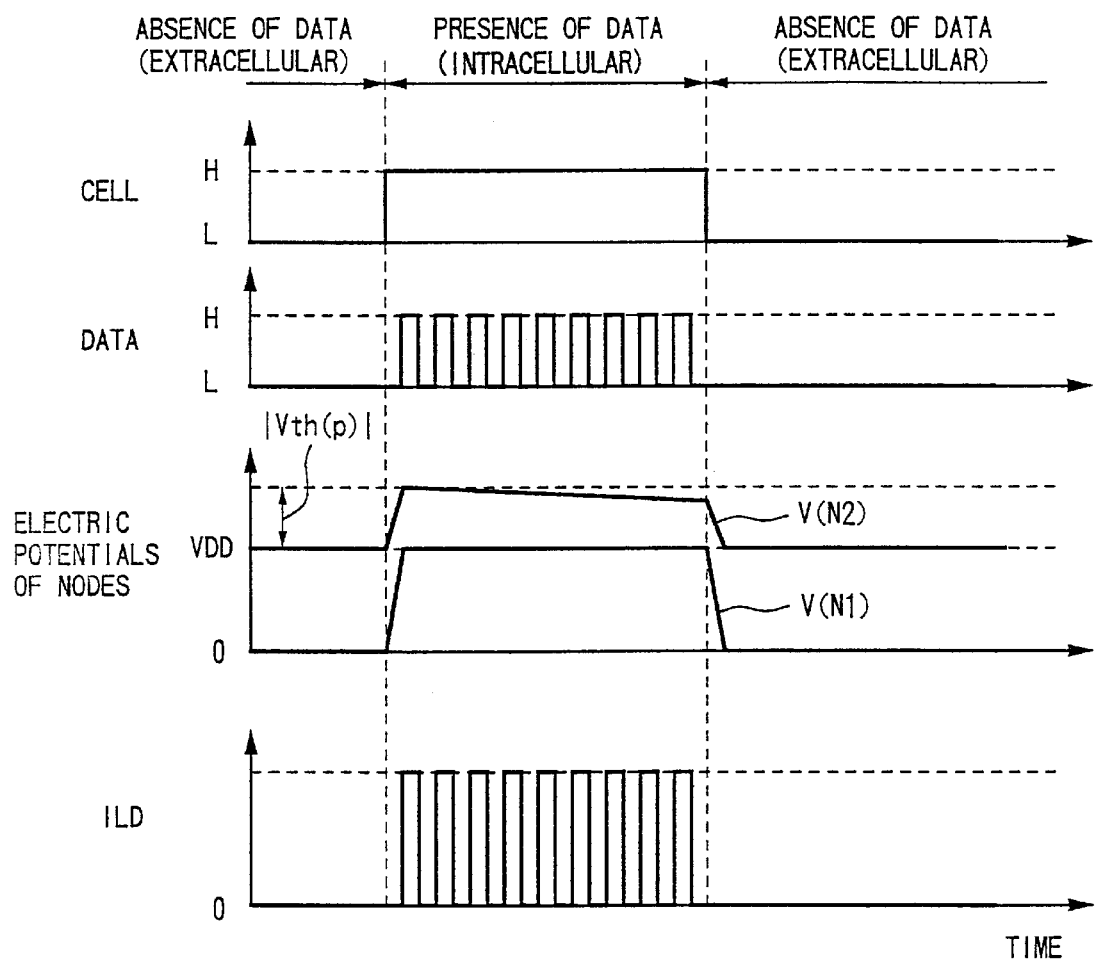
FIG. 7 is a time chart explaining the operation of the second embodiment.

Concretely as shown in FIG. 7, the cell signal CELL and data signal DATA are brought into LOW levels, respectively, and the reversed data signal XDATA is brought into a HIGH level, at the (extracellular) timing with no data. The cell signal CELL at the LOW level is supplied to the gate terminal of the p-channel MOSFET 52, and also input into the inverter 61. That signal, which has been inverted into a HIGH level by the inverter 61, is supplied to the gate terminals of the n-channel MOSFET 33 and p-channel MOSFET 51, respectively, and to the NOR gates 62, 63. The NOR gate 62 calculates the negation of the logical sum of the output signal from the inverter 61 and the data signal DATA, and the resultant LOW level signal is supplied to the gate terminal of the n-channel MOSFET 32. Further, the NOR gate 63 calculates the negation of the logical sum of the output signal from the inverter 61 and the reversed data signal XDATA, and the resultant LOW level signal is supplied to the gate terminal of the n-channel MOSFET 31. Thus, the p-channel MOSFET 52 and n-channel MOSFET 33 are turned on, and the p-channel MOSFET 51 and n-channel MOSFET's 31, 32 are turned off. This results in a constant electric current through the p-channel MOSFET 52, node N2, capacitor 4, node N1, n-channel MOSFET 33 and current source 1 in this order as depicted by an arrow headed broken line in FIG. 6, to thereby charge the capacitor 4 and bring the electric potential V(N2) of the node N2 to the supply voltage VDD as shown at the middle lower row of FIG. 7.

In the aforementioned extracellular timing, the inflow of the electric current into the current source 1 will be stopped upon completion of charging of the capacitor 4. Nonetheless, since it is unnecessary to conduct the high speed modulation of the light emitting element 2 at the extracellular timing, the driving of the light emitting element 2 is not affected even if the operation of the current source 1 is stopped.

Meantime, at the (intracellular) timing with data, there is further conducted the switching of the electric current path between the situation of light extinction by the data signal DATA at a LOW level and the situation of light emission by the data signal DATA at a HIGH level.

Concretely, at the timing of intracellular light extinction, the data signal DATA is brought into a LOW level, and the cell signal CELL and reversed data signal XDATA are brought into HIGH levels, respectively. This results in that the p-channel MOSFET 52 is turned off by the reception of the cell signal CELL at the HIGH level, and the p-channel MOSFET 51 is turned on by the reception of the signal inverted to a LOW level by the inverter 61. Further, the n-channel MOSFET 33 is turned off by the reception of the signal inverted to a LOW level by the inverter 61, the n-channel MOSFET 32 is turned on by the reception of the HIGH level signal output from the NOR gate 62, and the n-channel MOSFET 31 is turned off by the reception of the LOW level signal output from the NOR gate 63. This results in a constant electric current through the p-channel MOSFET 51, node N1, capacitor 4, node N2, n-channel MOSFET 32 and current source 1 in this order as depicted by an arrow headed alternate long and short dash line (which partially overlaps with a solid line). At this time, although the electric potential V(N2) at the node N2 is boosted to VDD+|Vth(p)| as shown at the middle lower row in FIG. 7, no current flows into the path through the light emitting element 2 so that this element 2 is brought into the light extinction state.

Further, at the timing of intracellular light emission, the cell signal CELL and data signal DATA are brought into HIGH levels, respectively, and the reversed data signal XDATA is brought into a LOW level. This results in that the p-channel MOSFET 52 is turned off by the reception of the cell signal CELL at the HIGH level, and the p-channel MOSFET 51 is turned on by the reception of the LOW level signal output from the NOR gate 62. Further, the n-channel MOSFET 33 is turned off by the reception of the signal inverted to a LOW level by the inverter 61, the n-channel MOSFET 32 is turned off by the reception of the signal inverted to a LOW level by the inverter 61, and the n-channel MOSFET 31 is turned on by the reception of the HIGH level signal output from the NOR gate 63. This results in a constant electric current through the p-channel MOSFET 51, node N1, capacitor 4, node N2, light emitting element 2, n-channel MOSFET 31 and current source 1 in this order as depicted by an arrow headed solid line, so that the boosted electric potential V(N2) at the node N2 is applied to the light emitting element 2 to thereby bring the same into a light emission state.

In the aforementioned circuitry, it is required to set the capacity of the capacitor 4 corresponding to such as the length of one unit cell, because the charge accumulated in the capacitor 4 is discharged during the intracellular period, irrespectively of light emission/light extinction. There will be described hereinafter a concrete setting example.

For example, it is assumed that this circuit is to be used under such a condition that: the light emitting element 2 has a maximum driving current I of 100 mA; a time period T corresponding to a unit cell is 3 $\mu$s (it is assumed here that an allowable number of cells is one); the p-channel MOSFET 52 has its threshold voltage Vth(p) of 0.8V; and an electric potential VLDD required for the light emitting element 2 and the driving circuit is 2.5V or higher. Then, the capacity C1 of the capacitor 4 can be designed to satisfy the following prerequisite, making use of such a relationship that Q=C1·$\Delta$V=I·T, where Q is a charge to be accumulated, and $\Delta$V is an interterminal electric potential difference of capacitor 4.

C1 $\geq$ I·T/$\Delta$V
$\geq$ I·T/(VDD+Vth(p)−VLDD)
$\geq$ 100 mA·3$\mu$s/(1.8+0.8−2.5)V
$\geq$ 3 $\mu$F.

In the aforementioned usage prerequisite, it is possible to use a capacitor having, for example, a capacity of 3.3 $\mu$F.

According to the second embodiment as described above, in the burst transmission method, there can be obtained the same effect with the first embodiment even by conducting the switching control of the electric current path such as making use of the cell signal CELL to thereby charge the capacitor 4 at the extracellular timing and discharge the capacitor 4 at the intracellular timing.

In the second embodiment, the circuitry is constituted such that the charge accumulated in the capacitor 4 is discharged at the intracellular timing where the data signal is at the LOW level. However, such useless consumption of the charge of the capacitor 4 at the time of light extinction can be avoided, for example, by modifying the circuitry to a circuitry shown in FIG. 8. Namely, in the circuitry of FIG. 8, that drain terminal of the n-channel MOSFET 32 which has been connected to the node N2 is modified to be connected to the common connecting point of the p-channel MOSFET 51 and p-channel MOSFET 52 which point is applied with the supply voltage VDD. In this way, the electric current path at the time of the intracellular light extinction is directed via n-channel MOSFET 32 only to the current source 1 as shown by an arrow headed alternate long and short dash line of FIG. 8, without passing through the capacitor 4. Such a circuitry enables the intracellular state to be kept for a longer time.

There will be described hereinafter a third embodiment of the present invention.

Whereas the aforementioned second embodiment has been constituted such that the electric current path is switched so as to charge the capacitor at the extracellular timing making use of the cell signal, this third embodiment exhibits an example where the capacitor is charged at the extracellular timing, additionally making use of a clock signal.

Figure 9:
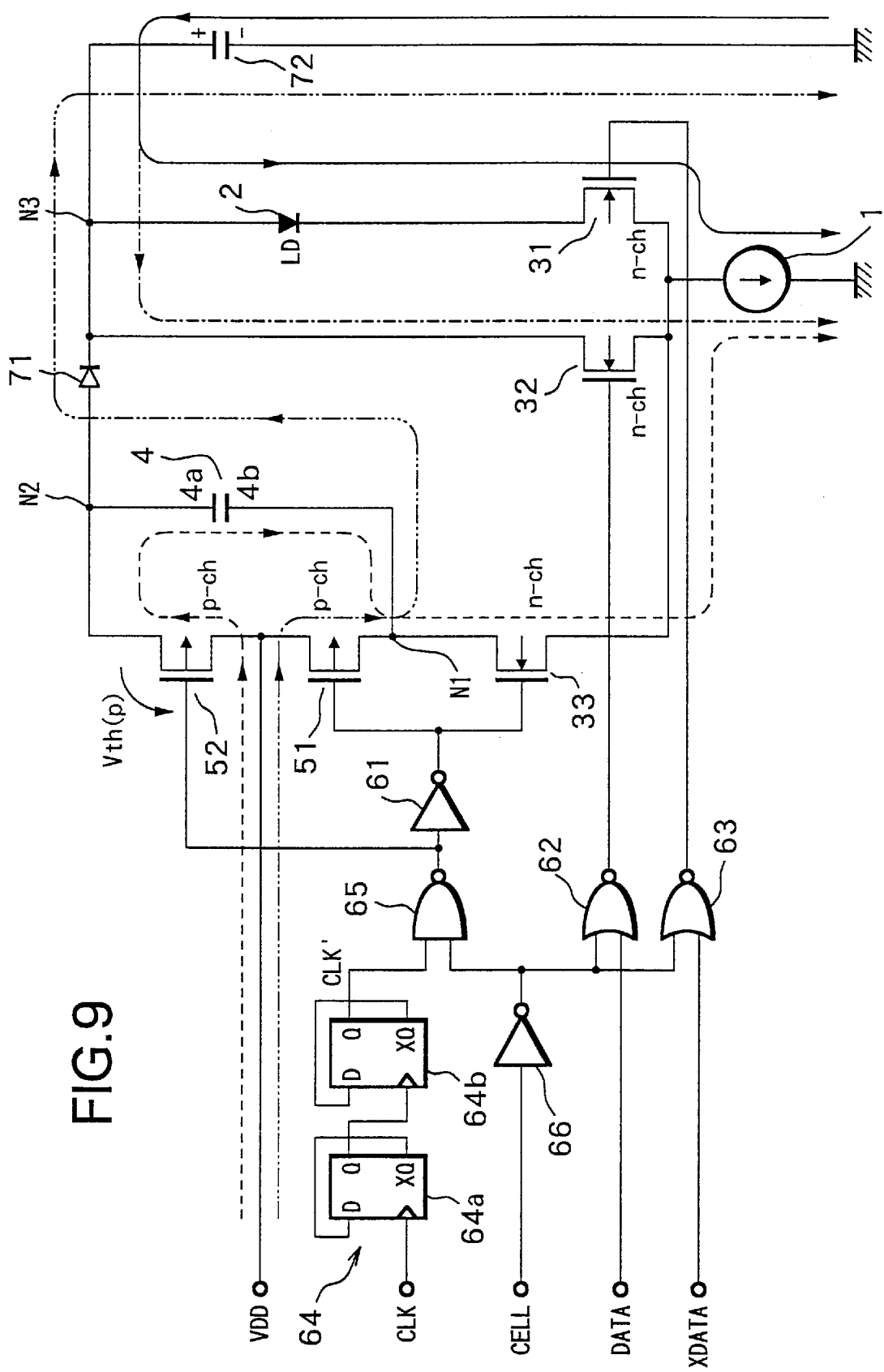
FIG. 9 is a view showing a constitution of a light emitting element driving circuit according to a third embodiment of the present invention.

FIG. 9 is a view showing a constitution of a light emitting element driving circuit according to the third embodiment.

The light emitting element driving circuit shown in FIG. 9 is provided based on the second embodiment shown in FIG. 6, such that: there is provided a clock signal CLK synchronized with the data signal DATA, from such as the outside; the clock signal CLK is divided by a dividing circuit 64 to thereby generate a clock signal CLK'; the operations of the current switch 3 and boosting switch 5 are controlled based on the clock signal CLK', and based on the cell signal CELL, data signal DATA and reversed data signal XDATA which have been used in the second embodiment. Further, since the boosted electric potential at the node N2 varies in accordance with the clock signal CLK' as described later, there are added a rectifier 71 and a capacitor 72 for conducting rectification, thereby realizing stabilization of the boosted supply voltage.

The dividing circuit 64 is constituted of such as two series connected D flip-flops 64a, 64b. The D flip-flop 64a has a clock input terminal input with the clock signal CLK from the outside, and a data input terminal and a reversed data output terminal connected to each other. Further, the D flip-flop 64b has a clock input terminal input with a signal output from the data output terminal of the D flip-flop 64a, and a data input terminal and a reversed data output terminal connected to each other. A signal to be output from the data output terminal of the D flip-flop 64b becomes the clock signal CLK' to be obtained by dividing the frequency of the clock signal CLK, and is input into a NAND gate 65. The NAND gate 65 is also input with the cell signal CELL inverted by an inverter 66, and calculates the negation of the logical product of the clock signal CLK' and the inverted cell signal CELL. The calculation result is supplied to the gate terminal of the p-channel MOSFET 52 and to the inverter 61. Further, the cell signal CELL inverted by the inverter 66 is also supplied to the NOR gates 62, 63.

The rectifier 71 is connected, for example, between the node N2 connected with such as the terminal 4a of the capacitor 4 and a node N3 connected with such as the anode terminal of the light emitting element 2, and has its forward direction from the node N2 toward the node N3. The capacitor 72 is connected between the node N3 and a grounded terminal.

In the light emitting element driving circuit having the aforementioned constitution, the electric current path is switched such that the capacitor 4 and capacitor 72 are charged, in accordance with the divided clock signal CLK', at the extracellular timing in which burst data is not being generated; and discharged, irrespectively of the data level, at the intracellular timing in which burst data is being generated.

Figure 10:
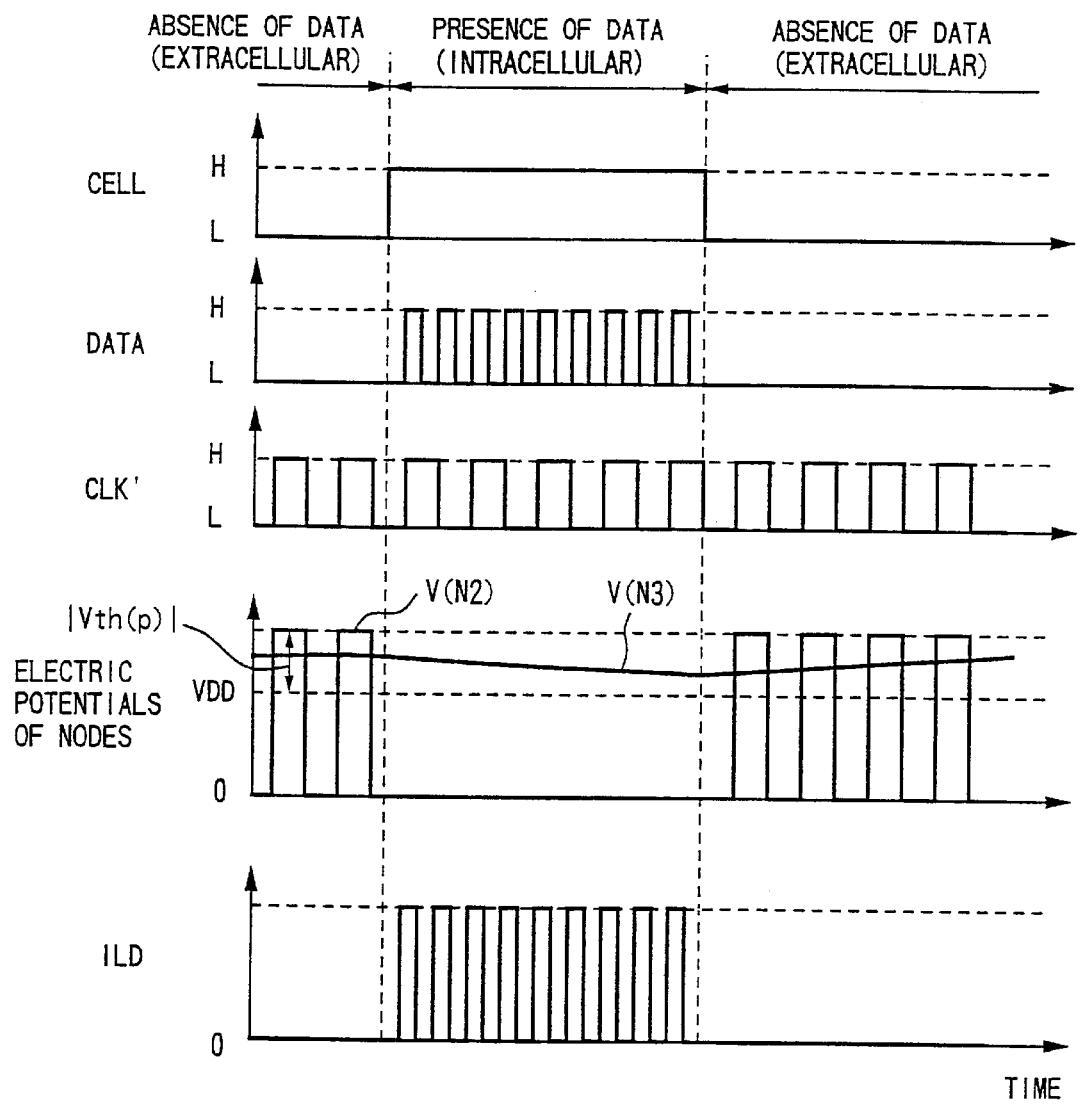
FIG. 10 is a time chart explaining the operation of the third embodiment.

Concretely as shown in FIG. 10, the cell signal CELL and data signal DATA are brought into LOW levels, respectively, and the reversed data signal XDATA (not shown) is brought into a HIGH level at the (extracellular) timing without data. On the other hand, the divided clock signal CLK' is brought into HIGH level and LOW level repeatedly at a period set by the dividing circuit 64, irrespectively of the presence and absence of data (intracellular and extracellular).

Considering a situation where the clock signal CLK' is at a HIGH level at the extracellular timing, this clock signal CLK' at the HIGH level and the signal at a HIGH level output from the inverter 66 are supplied to the NAND gate 65, and this NAND gate 65 outputs a LOW level signal to the p-channel MOSFET 52 and inverter 61. Further, the signal inverted into a HIGH level by the inverter 61 is supplied to the p-channel MOSFET 51 and n-channel MOSFET 33. The data signal DATA at a LOW level and the signal inverted into a HIGH level by the inverter 66 are supplied to the NOR gate 62, and this gate 62 supplies a LOW level signal to the n-channel MOSFET 32. Moreover, the reversed data signal XDATA at a HIGH level and the signal inverted into a HIGH level by the inverter 66 are supplied to the NOR gate 63, and this gate 63 supplies a LOW level signal to the n-channel MOSFET 31. Thus, the p-channel MOSFET 52 and n-channel MOSFET 33 are turned on, and the p-channel MOSFET 51 and n-channel MOSFET's 31, 32 are turned off. This results in a constant electric current through the p-channel MOSFET 52, node N2, capacitor 4, node N1, n-channel MOSFET 33 and current source 1 in this order as depicted by an arrow headed broken line in FIG. 9, to thereby charge the capacitor 4.

Further, where the clock signal CLK' is brought into a LOW level at the extracellular timing, a HIGH level signal is output from the NAND gate 65, a LOW level signal is output from the inverter 61, the p-channel MOSFET 51 is turned on, and the p-channel MOSFET 52 and n-channel MOSFET 33 are turned off. Further, the n-channel MOSFET's 31, 32 are turned off, similarly to the timing where the clock signal CLK' is at a HIGH level. This results in a constant electric current through the p-channel MOSFET 51, node N1, capacitor 4, node N2, rectifier 71, node N3 and capacitor 72 in this order as depicted by an arrow headed alternate long and two short dashes line in FIG. 9. At this time, the electric potential V(N2) at node N2 is boosted up to VDD+|Vth(p)| by the charge accumulated in the capacitor 4, and the electric current flows through the rectifier 71 and capacitor 72 to thereby charge this capacitor 72.

Since a voltage drop is caused at the rectifier 71 by an amount of its interterminal voltage, it is desirable to adopt an element having a higher threshold voltage Vth(p) for the p-channel MOSFET 52, and, for example, it is preferable to adopt such an element having a threshold voltage Vth(p) on the order of 1 V. Further, the operating voltage of the rectifier 71 in the forward direction is desirably as low as possible, and, for example, it is preferable to adopt a rectifier using a MOS transistor and the like having its threshold voltage Vth(r) on the order of 0.3V. When the supply voltage VDD is 1.8V in case of adopting the aforementioned circuitry parts, the electric potential V(N3) at the node N3 is boosted by approximately 0.7(=1−0.3)V to approximately 2.5V and stabilized there.

As described above, the capacitors 4 and 72 are duly charged in accordance with the divided clock signal, at the extracellular timing. At this time, no electric current flows into the current source 1, upon completion of charging of the capacitors 4 and 72. Nonetheless, since high speed modulation of the light emitting element 2 is unnecessary at the extracellular timing, the stoppage of the current source 1 does not affect the driving of the light emitting element 2.

Turning to the intracellular timing, the cell signal CELL at a HIGH level is inverted by the inverter 66 to a LOW level and then supplied to the NAND gate 65, so that the NAND gate 65 outputs a HIGH level signal irrespectively of the level of the clock signal CLK'. In this way, similarly to the situation of the intracellular timing in the second embodiment, the p-channel MOSFET 51 is turned on, the p-channel MOSFET 52 and n-channel MOSFET 33 are turned off, and the n-channel MOSFET 32 and n-channel MOSFET 31 are switchedly operated corresponding to the levels of the data signal DATA and reversed data signal XDATA.

Concretely, when the data signal is at a HIGH level, the n-channel MOSFET 31 is turned on and the n-channel MOSFET 32 is turned off, thereby resulting in a constant electric current through the capacitor 72, node N3, light emitting element 2, n-channel MOSFET 31 and current source 1 in this order as depicted by an arrow headed solid line in FIG. 9, such that the boosted electric potential V(N3) at the node N3 is applied to the light emitting element 2 to bring it into a light emission state.

Further, when the data signal is at a LOW level, the n-channel MOSFET 32 is turned on and the n-channel MOSFET 31 is turned off, thereby resulting in a constant electric current through the capacitor 72, node N3, n-channel MOSFET 32 and current source 1 in this order as depicted by an arrow headed alternate long and short dash line in FIG. 9, to thereby bring the light emitting element 2 into a light extinction state. Shown at the lowermost row of FIG. 10 is a transitional state of the driving current ILD to be supplied to the light emitting element 2.

According to the third embodiment as described above, there can be obtained an effect identical with the second embodiment, even by judging the extracellular timing corresponding to the cell signal CELL and by charging the capacitor in accordance with the divided clock signal CLK'. Further, the provision of the rectifier 71 and capacitor 72 stabilizes the fluctuation of voltage corresponding to the clock signal CLK', thereby enabling application of a boosted higher supply voltage to the light emitting element 2.

In the aforementioned third embodiment, the clock signal CLK divided by the dividing circuit 64 has been used for the switching control. However, it is possible by the present invention to directly use the undivided clock signal CLK for the control. Further, the ratio of division can be suitably set corresponding to the frequency of the clock signal CLK.

Figure 11:
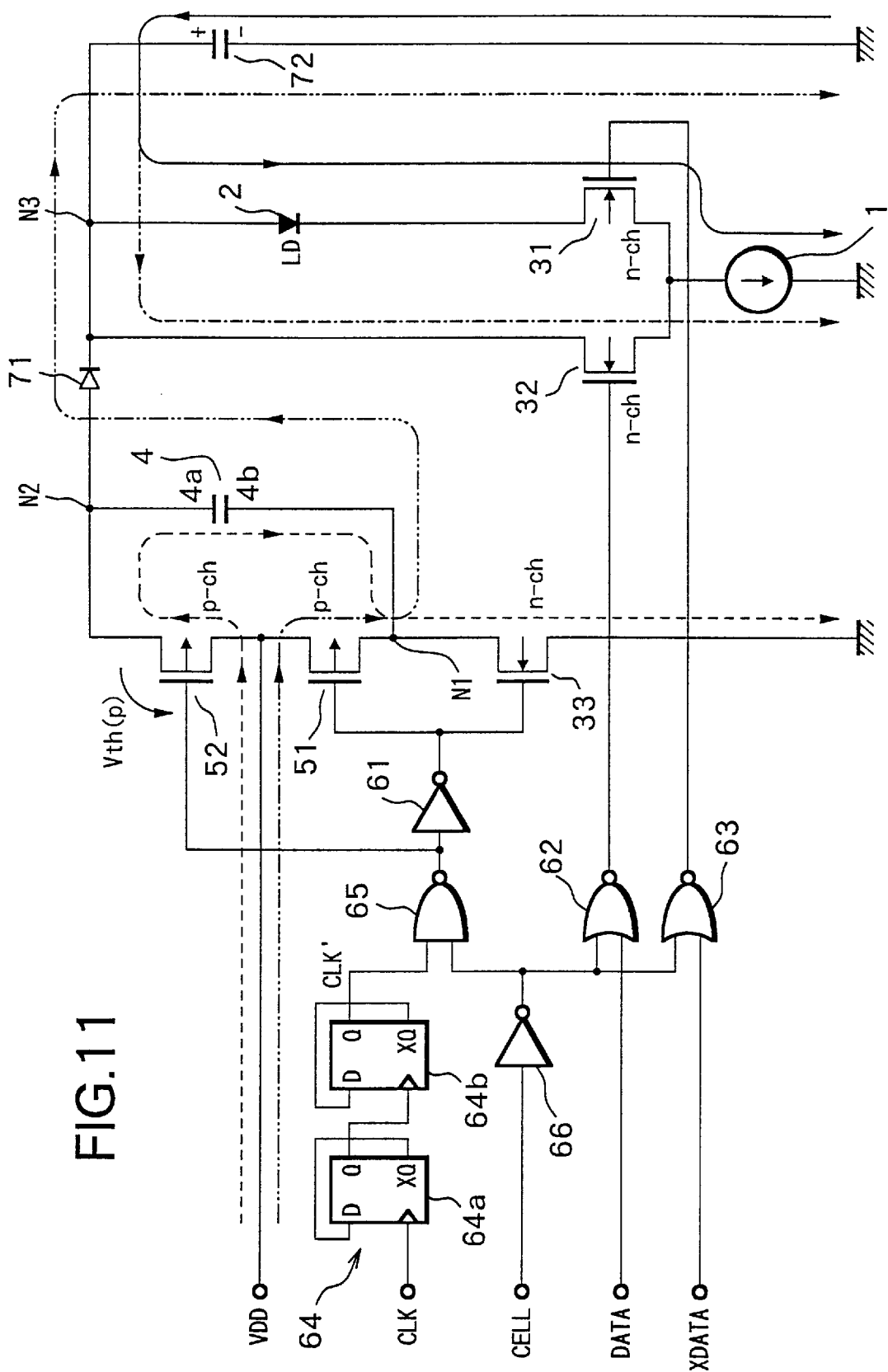
FIG. 11 is a view showing another exemplary circuitry concerning the third embodiment.

Moreover, the circuitry has been established such that the electric current flows into the current source 1 at the extracellular timing. However, the source terminal of the n-channel MOSFET 33 may be grounded such as shown in FIG. 11. Such a circuitry enables to shorten the charging time of the capacitor.

Figure 12:
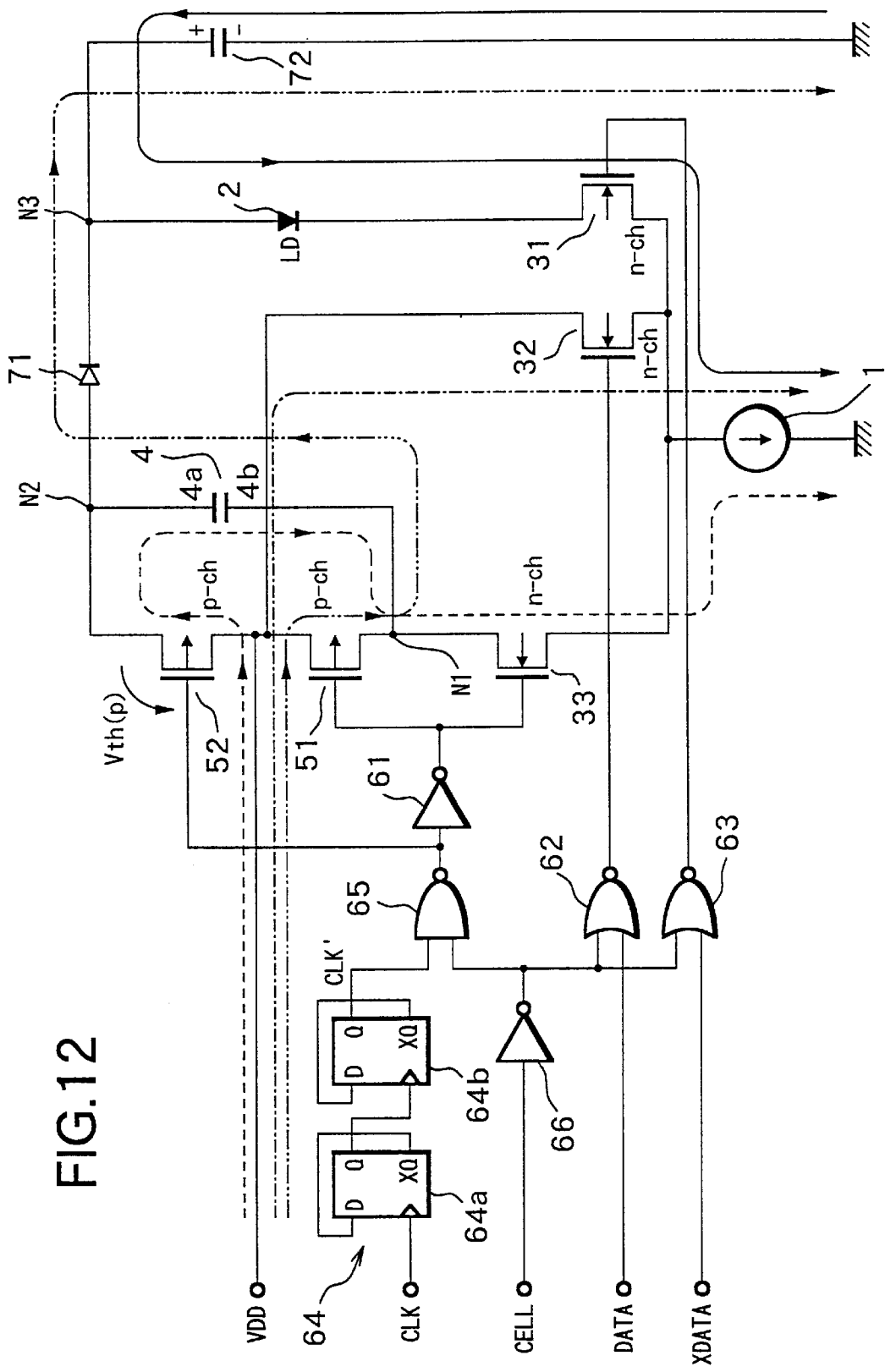
FIG. 12 is a view showing still another exemplary circuitry concerning the third embodiment.

In addition, the circuitry has been established such that the charge accumulated in the capacitor 72 is discharged at the intracellular timing. However, by modifying the circuitry to that as shown in FIG. 12, there can be avoided such a situation that the charge of the capacitor 72 is wastefully consumed at the time of light extinction. Namely, in the circuitry of FIG. 12, the drain terminal of the n-channel MOSFET 32 which has been connected to the node N3 is modified to be connected to the common connecting point of the p-channel MOSFET's 51, 52, which point is applied with the supply voltage VDD. This results in an electric current path at the intracellular light extinction timing from the n-channel MOSFET 32 to the current source 1 as shown by an arrow headed alternate long and short dash line in FIG. 12, to thereby enable the much lowered power consumption of this circuit and to thereby enable the intracellular state to be kept for a longer time.

There will be described hereinafter a fourth embodiment of the present invention.

This fourth embodiment exhibits an example where the aforementioned third embodiment is improved so that the cell signal CELL having been provided from such as the outside is generated within the circuit based on the data signal DATA.

Figure 13:
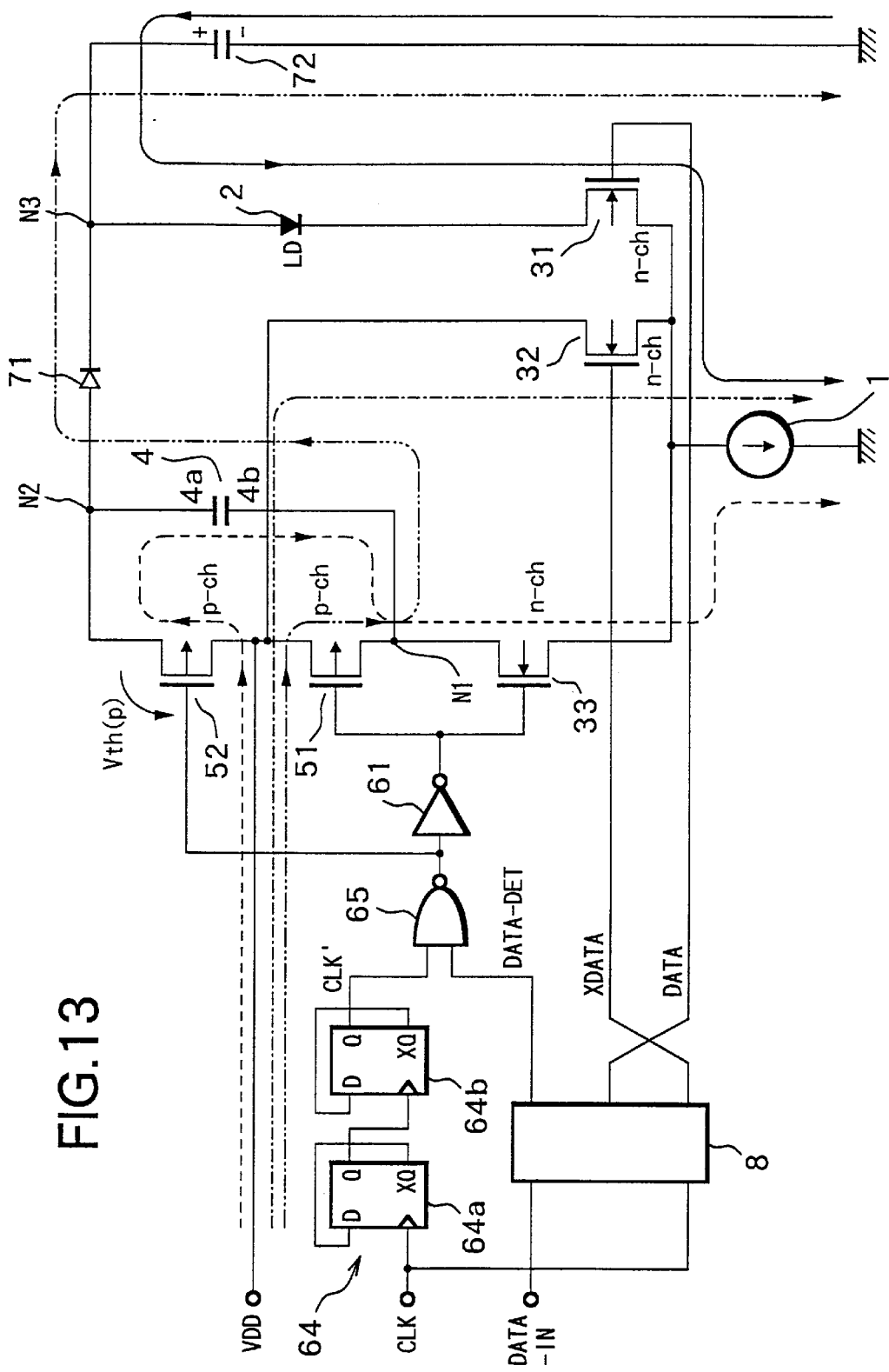
FIG. 13 is a view showing a constitution of a light emitting element driving circuit according to a fourth embodiment of the present invention.

FIG. 13 is a view showing a constitution of a light emitting element driving circuit according to the fourth embodiment.

The light emitting element driving circuit shown in FIG. 13 has a constitution provided with a data detecting part 8 for generating, based on the data signal DATA, a data detection signal DATA-DET corresponding to the cell signal CELL while omitting the NOR gates 62, 63 and inverter 66, concerning for example the aforementioned third embodiment shown in FIG. 12. The circuitry other than the above is identical with that shown in FIG. 12.

Figure 14:
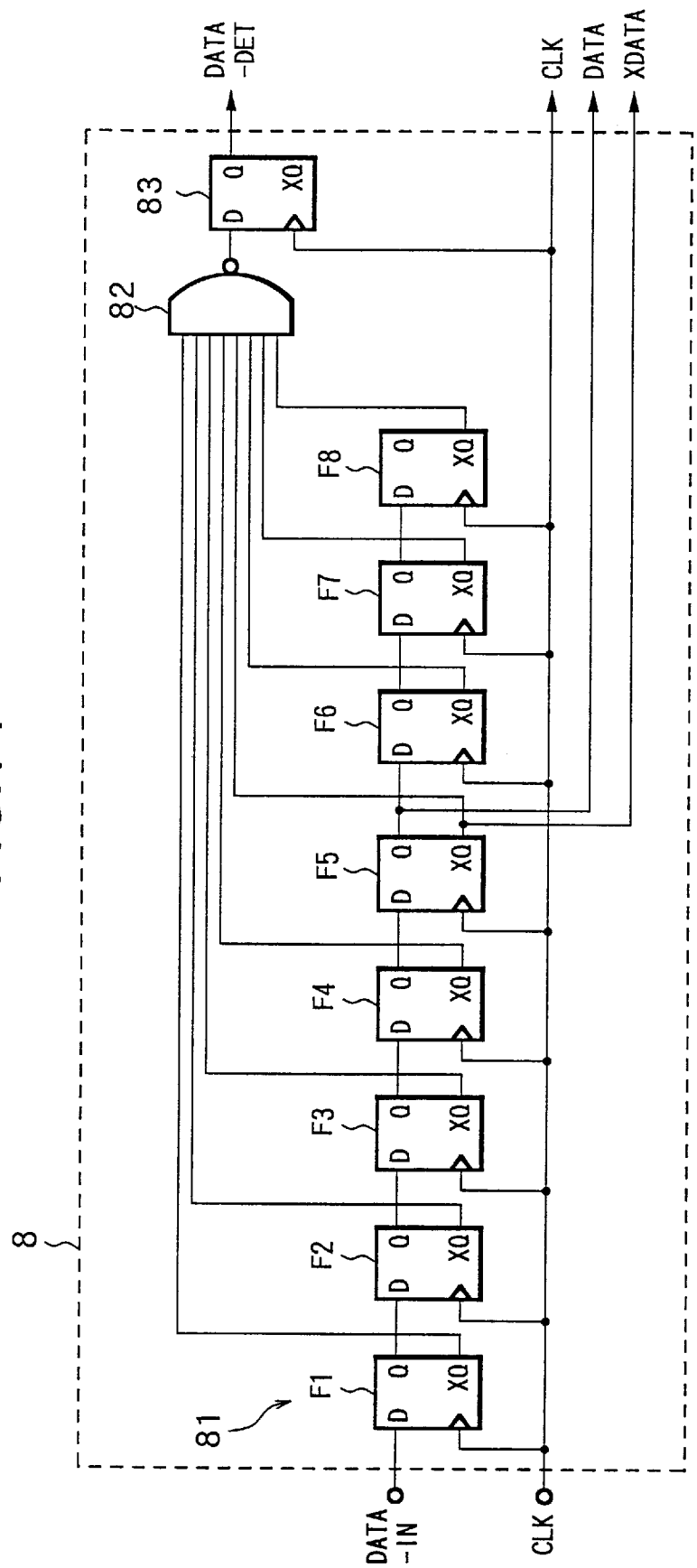
FIG. 14 is a circuit diagram showing a concrete example of a data detecting part in the fourth embodiment.

FIG. 14 is a view showing an example of a concrete circuitry of the data detecting part 8.

In FIG. 14, the data detecting part 8 includes: a shift register 81 comprising eight D flip-flops F1 to F8; an inverter 84 inverting the data signal DATA-IN; a NAND gate 82 for calculating the NAND of the reversed data output signals of the D flip-flops F1 to F8 and the inverter 84; and a D flip-flop 83 for outputting the data detection signal DATA-DET by treating the output signal of the NAND gate 82 as a data input.

The D flip-flops F1 to F8 of the shift register 81 have clock input terminals input with the clock signals CLK, respectively. The D flip-flop F1 at the first stage has a data input terminal D input with an input data signal DATA-IN, a data output terminal Q connected to a data input terminal of the D flip-flop F2, and a reversed data output terminal XQ connected to an input terminal of the NAND gate 82. Concerning the D flip-flops F2 to F8 at the second stage and so forth, the data output terminal Q and data input terminal D of the neighboring two D flip-flops are connected to each other, and the reversed data output terminals XQ are connected to the input terminals of the NAND gate 82, respectively. It is assumed herein that the data output and reversed data output of the D flip-flop F5 at the fifth stage are taken out as the data signal DATA and the reversed data signal XDATA which are then supplied to the gate terminals of the n-channel MOSFET 31 and n-channel MOSFET 32 shown in FIG. 13, respectively.

The NAND gate 82 calculates the negation of the logical product of the reversed data outputs of the D flip-flops F1 to F8, and supplies a signal indicative of the calculation result to the data input terminal D of the D flip-flop 83. The D flip-flop 83 has a clock input terminal input with the clock signal CLK, and receives the output signal from the NAND gate 82 to thereby output the data detection signal DATA-DET from the data input terminal D. This data detection signal DATA-DET is supplied to the NAND gate 65 shown in FIG. 13. It is noted that the NAND gate 65 is input with the clock signal CLK' divided by the dividing circuit 64 identically with the third embodiment.

There will be now briefly explained the operation of the data detecting part 8.

Figure 15:
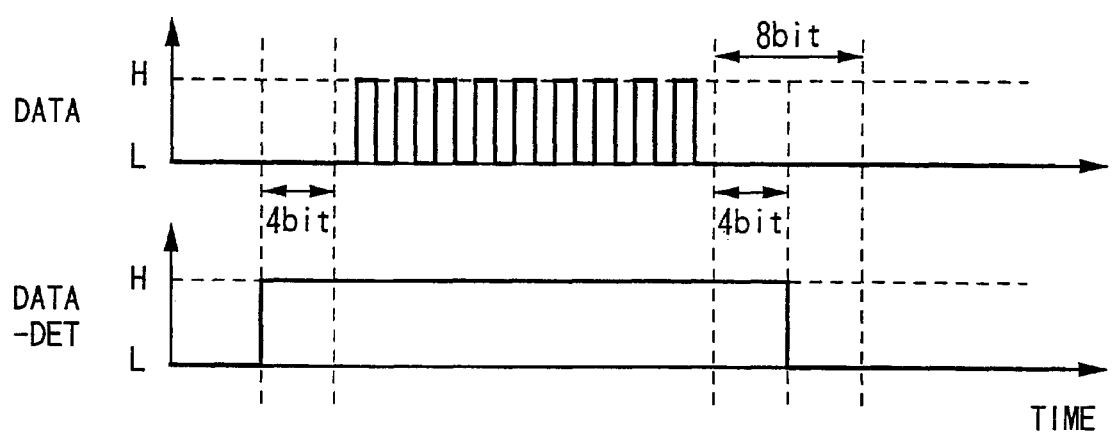
FIG. 15 is a view explaining signals to be output from the data detecting part of FIG. 14.

As shown in FIG. 15, the data detecting part 8 conducts such an operation that: the data detection signal becomes HIGH indicative of the presence of data, 4 bits before the data signal DATA is changed to HIGH after a succession of LOW levels; and the data detection signal is kept at a HIGH level for 4 bits after the last HIGH level of the data signal DATA in a case of a succession of LOW levels in the data signal DATA for more than 8 bits.

Concretely, the logical values at the respective portions of the data detecting part 8 are changed as shown in the following Table 1, when the input data signal DATA-IN to the shift register 81 is changed between a state including continuous "0's" indicative of a LOW level and another state including "1" indicative of a HIGH level.

level by detecting a sion of "0's" of the data signal DATA. Thus, there can be generated, this circuit, a signal corresponding to the cell signal CELL used in aforementioned third embodiment. Further, this data detection signal DET is supplied to the NAND gate 65, so that the operations of respective switches are controlled to conduct the switching of the electric current path in the manner identical with the third embodiment.

In the aforementioned fourth embodiment, the data detection signal DATA-DET is generated making use of the data signal DATA and clock signal CLK. Thus, it becomes possible to rapidly drive the light emitting element 2 at a high voltage and a high speed, even in a system which is not supplied with the cell signal CELL. Such a circuitry can be advantageously applied not only to the burst transmission method but also to a standard continuous transmission method.

In the aforementioned fourth embodiment, there has been described a situation adopting the data detecting part 8 constituted of digital circuits. However, the circuitry of the data detecting part 8 to be utilized in the present invention is not limited to the above.

Figure 16:
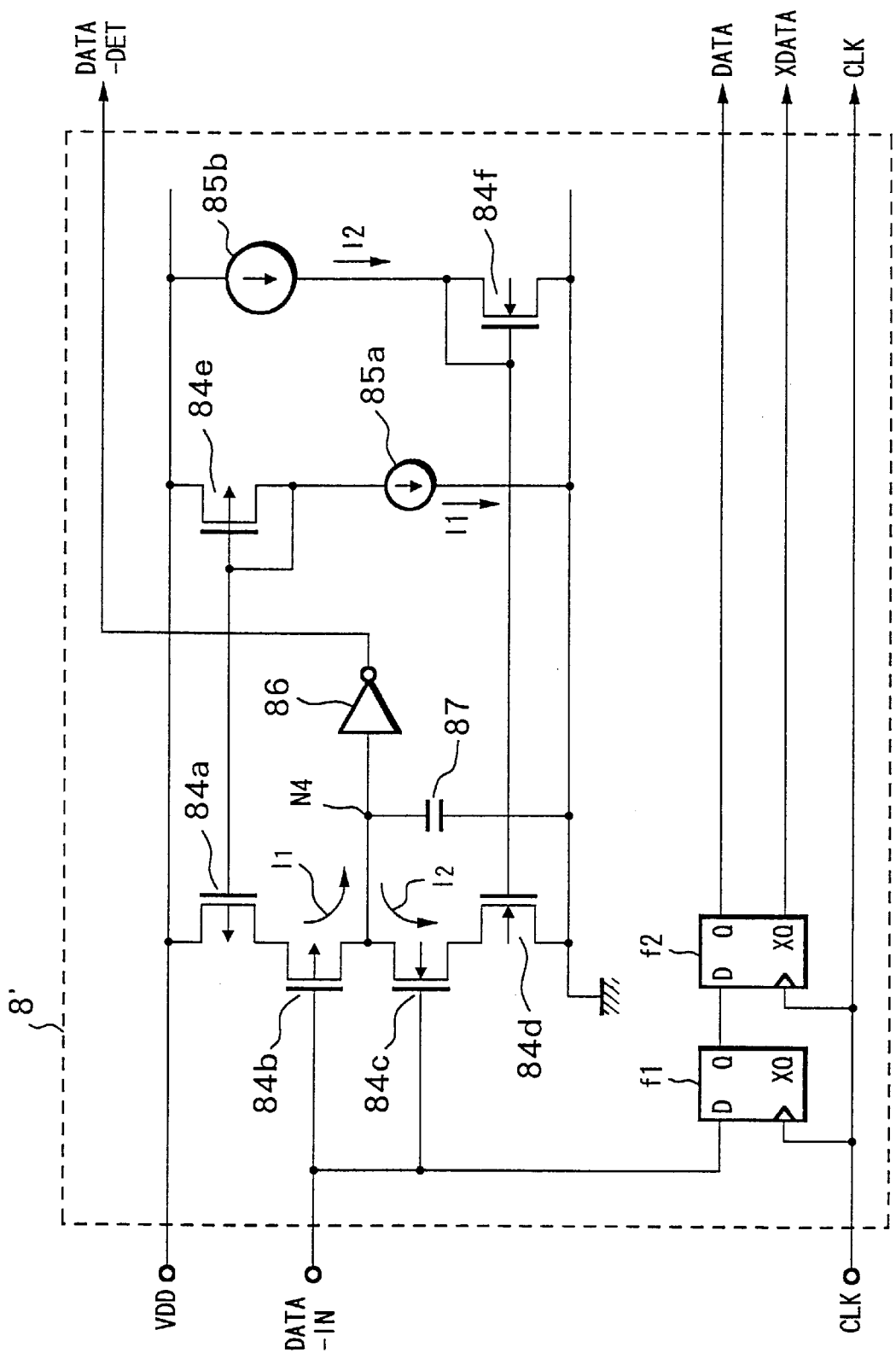
FIG. 16 is a circuit diagram showing a concrete example of another data detecting part concerning the fourth embodiment.

FIG. 16 is a view showing an example where the data detecting part is constituted of analog circuits.

In a data detecting part 8' of FIG. 16, an input data signal DATA-IN is delayed by two D flip-flops f1, f2 so as to

TABLE 1

| step | DATA | F1 Q | F2 Q | F3 Q | F4 Q | F5 Q | F6 Q | F7 Q | F8 Q | NAND | DATA-DET | DATA | XDATA |
|---|---|---|---|---|---|---|---|---|---|---|---|---|---|
| 1 | 0 | 0 | 0 | 0 | 0 | 0 | 0 | 0 | 0 | 0 | 0 | 0 | 0 |
| 2 | 1 | 0 | 0 | 0 | 0 | 0 | 0 | 0 | 0 | 1 | 0 | 0 | 0 |
| 3 | 1 | 1 | 0 | 0 | 0 | 0 | 0 | 0 | 0 | 1 | 1 | 0 | 0 |
| 4 | 1 | 1 | 1 | 0 | 0 | 0 | 0 | 0 | 0 | 1 | 1 | 0 | 0 |
| 5 | 1 | 1 | 1 | 1 | 0 | 0 | 0 | 0 | 0 | 1 | 1 | 0 | 0 |
| 6 | 1 | 1 | 1 | 1 | 1 | 0 | 0 | 0 | 0 | 1 | 1 | 0 | 0 |
| 7 | 1 | 1 | 1 | 1 | 1 | 1 | 0 | 0 | 0 | 1 | 1 | 1 | 0 |
| 8 | 1 | 1 | 1 | 1 | 1 | 1 | 1 | 0 | 0 | 1 | 1 | 1 | 1 |
| 9 | 1 | 1 | 1 | 1 | 1 | 1 | 1 | 1 | 0 | 1 | 1 | 1 | 1 |
| 10 | 1 | 1 | 1 | 1 | 1 | 1 | 1 | 1 | 1 | 1 | 1 | 1 | 1 |
| 11 | 0 | 1 | 1 | 1 | 1 | 1 | 1 | 1 | 1 | 1 | 1 | 1 | 1 |
| 12 | 0 | 0 | 1 | 1 | 1 | 1 | 1 | 1 | 1 | 1 | 1 | 1 | 1 |
| 13 | 0 | 0 | 0 | 1 | 1 | 1 | 1 | 1 | 1 | 1 | 1 | 1 | 1 |
| 14 | 0 | 0 | 0 | 0 | 1 | 1 | 1 | 1 | 1 | 1 | 1 | 1 | 1 |
| 15 | 0 | 0 | 0 | 0 | 0 | 1 | 1 | 1 | 1 | 1 | 1 | 1 | 1 |
| 16 | 0 | 0 | 0 | 0 | 0 | 0 | 1 | 1 | 1 | 1 | 1 | 0 | 1 |
| 17 | 0 | 0 | 0 | 0 | 0 | 0 | 0 | 1 | 1 | 1 | 1 | 0 | 0 |
| 18 | 0 | 0 | 0 | 0 | 0 | 0 | 0 | 0 | 1 | 1 | 1 | 0 | 0 |
| 19 | 0 | 0 | 0 | 0 | 0 | 0 | 0 | 0 | 0 | 0 | 1 | 0 | 0 |
| 20 | 0 | 0 | 0 | 0 | 0 | 0 | 0 | 0 | 0 | 0 | 0 | 0 | 0 |

From Table 1, there can be seen such a situation that: the input signal DATA-IN delayed by 5 bits by the shift register 81 is output as a signal DATA; the data detection signal DATA-DET changes from "0" to "1", 4 bits before the data signal DATA changes from "0" to "1"; and a detection signal DATA-DET changes from "1" to "0", 4 bits after a signal DATA has changed from "1" to "0".

In this way, the data detection signal DATA-DET to be generated at a detecting part 8 is brought into a HIGH level by detecting "1" of ta signal DATA and brought into a LOW generate the data signal DATA and reversed data signal XDATA. Further, there are generated the input data signal DATA-IN and data detection signal DATA-DET, by an analog circuit constituted of MOSFET's 84a to 84f, electric current sources 85a, 85b, an inverter 86 and a capacitor 87.

In this analog circuit, the p-channel MOSFET's 84a, 84b and n-channel MOSFET's 84c, 84d are series connected between the supply voltage terminal and the grounded terminal. Connected to the common connecting point of the p-channel MOSFET 84b and n-channel MOSFET 84c are:

one end of the capacitor 87 having another grounded end; and an input terminal of the inverter 86. An output signal of this inverter 86 becomes the data detection signal DATA-DET. Further, connected between the supply voltage terminal and the grounded terminal are: the p-channel MOSFET 84e and the electric current source 85a having an electric current amount I1, as well as the electric current source 85b having an electric current amount I2 and the n-channel MOSFET 84f, respectively. The electric current amount I2 shall be sufficiently greater than the electric current amount I1. The p-channel MOSFET 84e has its gate and drain terminals connected to each other, and this gate terminal is connected to a gate terminal of the p-channel MOSFET 84a to thereby form a current mirror. Also, the n-channel MOSFET 84f has its gate and drain terminals connected to each other, and this gate terminal is connected to a gate terminal of the n-channel MOSFET 84d to thereby form a current mirror.

In the data detecting part 8' having the aforementioned constitution, the electric current amount I1 flows from the p-channel MOSFET 84a toward the capacitor 87 to thereby charge the capacitor 87, when the input data signal DATA-IN is at a LOW level. Meanwhile, the charge accumulated in the capacitor 87 is discharged via the n-channel MOSFET 84d, when the input data signal DATA-IN is at a HIGH level. Thus, the level of the data detection signal DATA-DET is switched corresponding to the charge accumulated in the capacitor 87, based on the threshold voltage of the inverter 86.

Figure 17:
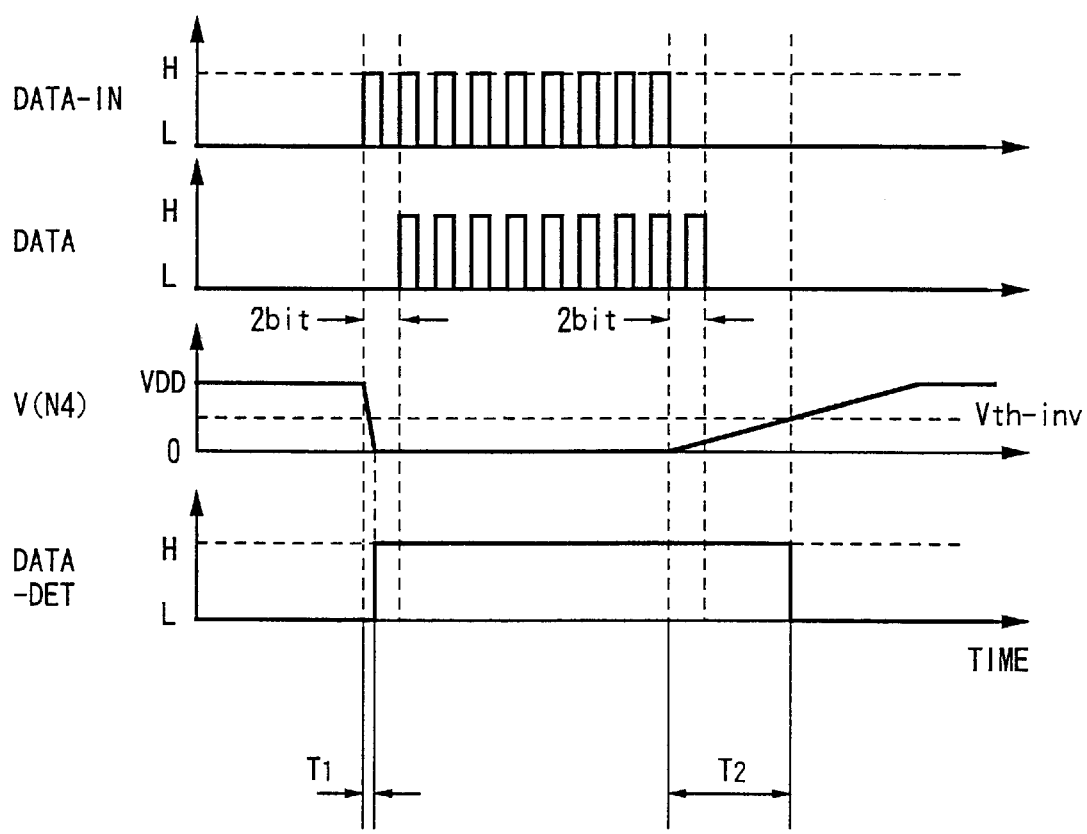
FIG. 17 is a view explaining signals to be output from the data detecting part of FIG. 16.

There will be concretely explained a circuit operation with reference to FIG. 17 in such a situation that the electric current amount I1 is 100 μA, the electric current amount I2 is 10 mA, the capacitor 87 has a capacity of 30 pF, and the inverter 86 has a threshold voltage of 0.9V.

The p-channel MOSFET 84b is kept ON and the n-channel MOSFET 84c is kept OFF, when the input data signal DATA-IN is kept at a LOW level as shown at the uppermost row of FIG. 17, resulting in that the capacitor 87 is charged by the electric current I1 to be supplied via the p-channel MOSFET 84a. Thus, the electric potential V(N4) at a node N4 connected to the capacitor 87 is seized at the supply voltage VDD as shown at the third row of FIG. 17. As a result, the input signal into the inverter 86 exceeds its threshold and is thus inverted by the inverter 86, so that the data detection signal DATA-DET at a LOW level is output as shown at the lowermost row of FIG. 17.

Next, when the input data signal DATA-IN is brought into a HIGH level, the p-channel MOSFET 84b is turned off and the n-channel MOSFET 84c is turned on, so that the electric current I2 flows from the capacitor 87 toward the n-channel MOSFET's 84c, 8d, to thereby discharge the capacitor 87. Thus, the electric potential V(N4) at the node N4 falls to the grounded level and is seized there, so that the data detection signal DATA-DET is changed to a HIGH level. The time period T1 required for the data detection signal DATA-DET to be changed to the HIGH level is calculated as follows, making use of a relationship Q=C·ΔV=I·T1 where Q is the charge, C is the capacity value, ΔV is the interterminal voltage and I is the electric current value, all concerning the capacitor 87:

$$T1 = C \cdot \Delta V / I$$

$$= 30 \text{ pF} \cdot (1.8 - 0.9) V / 10 \text{ mA} = 2.7 \text{ ns}$$

In the above situation, there can be detected the presence of one or more bits of "1's" of the input data, such as in the condition that 1 bit corresponds to 6.43 ns at a rate of 156 Mb/s.

Further, when the input data signal DATA-IN is brought into a LOW level, the p-channel MOSFET 84b is turned on and the n-channel MOSFET 84c is turned off, so that the electric potential V(N4) at the node N4 again starts to raise. However, if the input data signal DATA-IN becomes a HIGH level before the electric potential V(N4) exceeds the threshold voltage of the inverter 86, the electric potential V(N4) immediately falls to the grounded level as described above, so that the data detection signal DATA-DET is kept at a HIGH level.

Thereafter, a succession of the input data signal DATA-IN at a LOW level causes the electric potential V(N4) at the node N4 to raise and then exceed the threshold voltage of the inverter 86, so that the data detection signal DATA-DET is changed to a LOW level. The time period T2 required for the data detection signal DATA-DET to be changed to the LOW level is calculated as follows, making use of the relationship Q=C·ΔV=I·T1 similarly to the above case:

$$T2 = C \cdot \Delta V / I$$

$$= 30 \text{ pF} \cdot (0.9 - 0) V / 100 \text{ μA} = 270 \text{ ns}$$

In the above situation, the required time period T2 corresponds to successive 42 bits at LOW levels of the input data, such as in the condition that 1 bit corresponds to 6.43 ns at a rate of 156 Mb/s.

In this way, it is possible to generate the data detection signal DATA-DET substantially identical with that in the fourth embodiment, even by adopting the data detecting part 8' constituted to include the analog circuits.

There will be described hereinafter a fifth embodiment of the present invention.

This fifth embodiment is constituted to use a signal which detects the timing where the data signal is continuously kept at a LOW level, instead of the cell signal such as in the aforementioned second embodiment.

Figure 18:
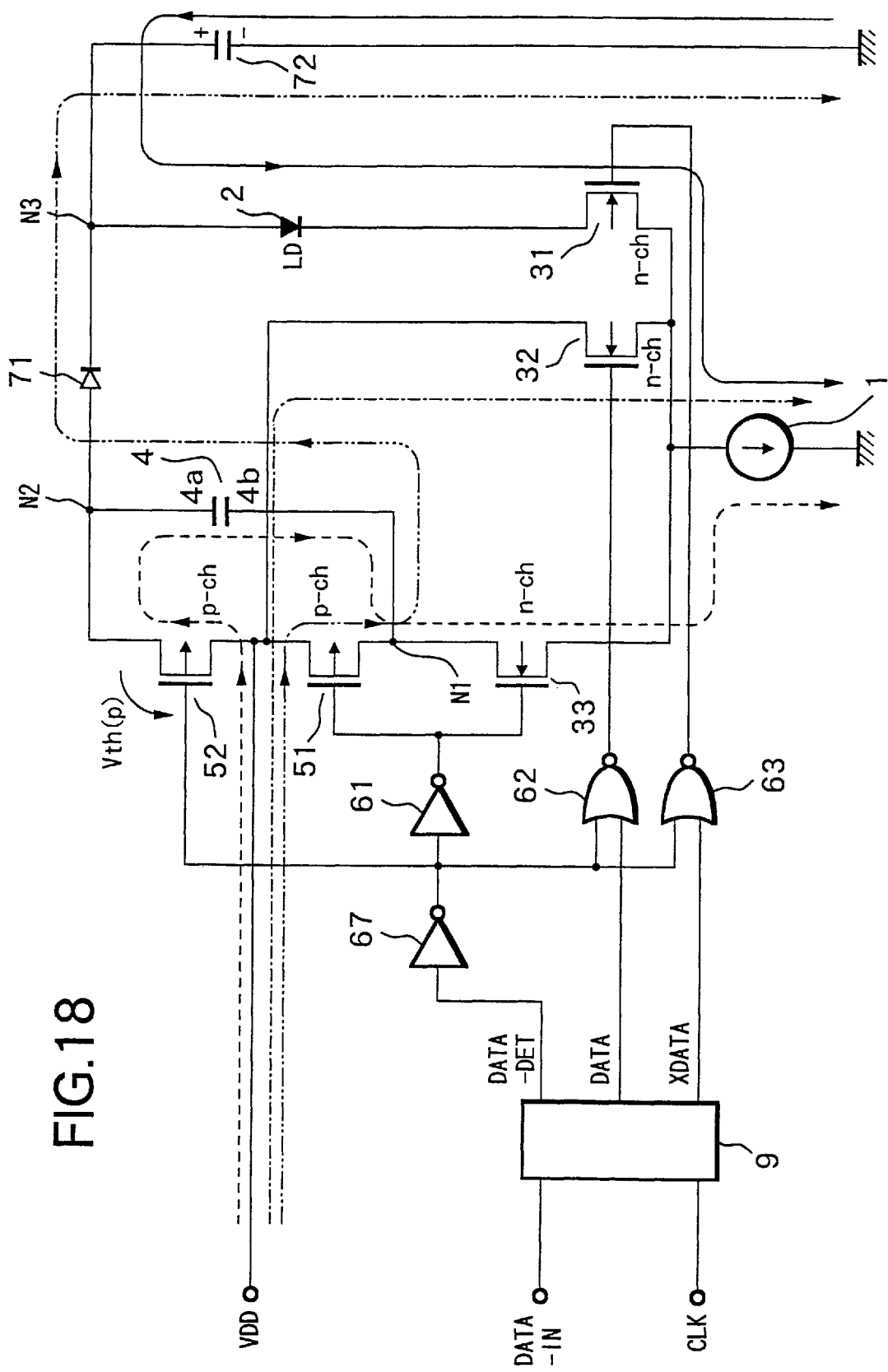
FIG. 18 is a view showing a constitution of a light emitting element driving circuit according to a fifth embodiment of the present invention.

FIG. 18 is a view showing a constitution of a light emitting element driving circuit according to the fifth embodiment.

Figure 8:
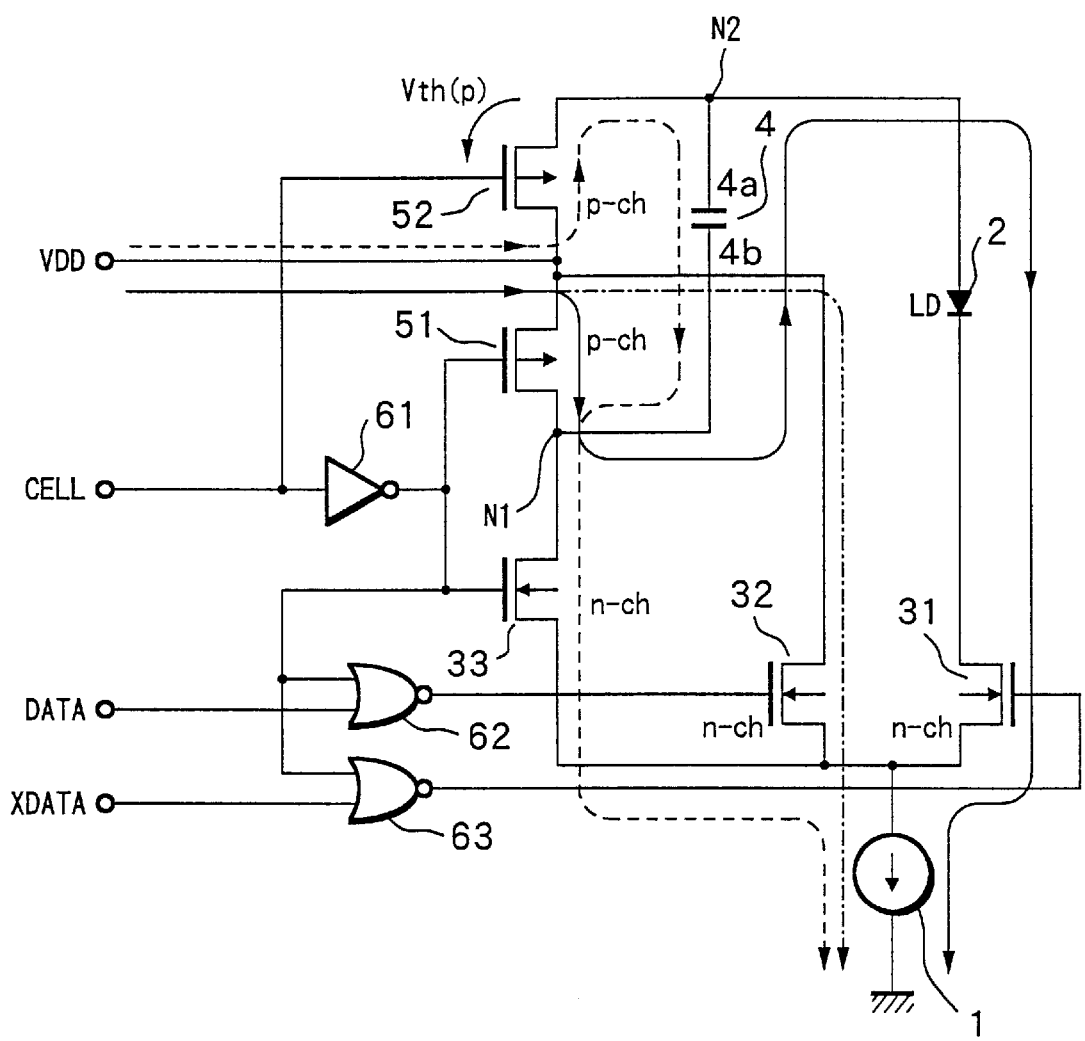
FIG. 8 is a view showing another exemplary circuitry concerning the second embodiment.

In FIG. 18, this light emitting element driving circuit has a constitution provided with a data detecting circuit 9 and an inverter 67 for inverting the data detection signal DATA-DET output from the data detecting circuit 9, such as concerning the aforementioned circuitry shown in FIG. 8.

The data detecting circuit 9 receives the input data signal DATA-IN and clock signal CLK, so as to detect the timing where the input data signal DATA-IN is continuously kept at a LOW level, and to output the data detection signal DATA-DET at a HIGH level. It is assumed here that the data detecting circuit 9 has a function to generate the data signal DATA and reversed data signal XDATA and to supply them to the NOR gates 62, 63, respectively. Data detecting circuits having such a function are common in the art, so that the explanation about a concrete circuitry thereof is omitted herein.

The inverter 67 inverts the data detection signal DATA-DET from the data detecting circuit 9, and supplies the inverted signal to the p-channel MOSFET 52, inverter 61 and NOR gates 62, 63.

In the light emitting element driving circuit of the aforementioned constitution, the data detection signal DATA-DET inverted by the inverter 67 is utilized instead of the cell signal CELL utilized in the aforementioned second embodiment, thereby obtaining the operations and effects identical with the second embodiment. Further, such a circuitry can be advantageously applied not only to the burst transmission method but also to a standard continuous transmission method.

There will be described hereinafter a sixth embodiment of the present invention.

In the aforementioned first through fifth embodiments, when switching the charging and discharging of the capacitor 4, there have been simultaneously conducted the two switching operations, i.e., the operation to open one terminal of the capacitor 4, which has been connected to the supply voltage terminal, from the supply voltage terminal, and the operation to short-circuit the other terminal of the capacitor 4, which has not been connected to the supply voltage terminal, to the supply voltage terminal. At the time of such simultaneous switching operations, there has been such a possibility that the switch for the charging path and the switch for the discharging (boost) path of the capacitor 4 are simultaneously kept in an ON state, only for a moment. In such a situation, both terminals of the capacitor 4 are short-circuited due to the two switching operations, resulting in a possibility that the especially accumulated charge is discharged to thereby deteriorate the voltage transforming efficiency. Thus, there is conducted such a sequence control in the sixth embodiment that the switches of the charging path and discharging path are simultaneously turned off once at the time of the aforementioned switching, and thereafter the other is turned on.

Figure 19:
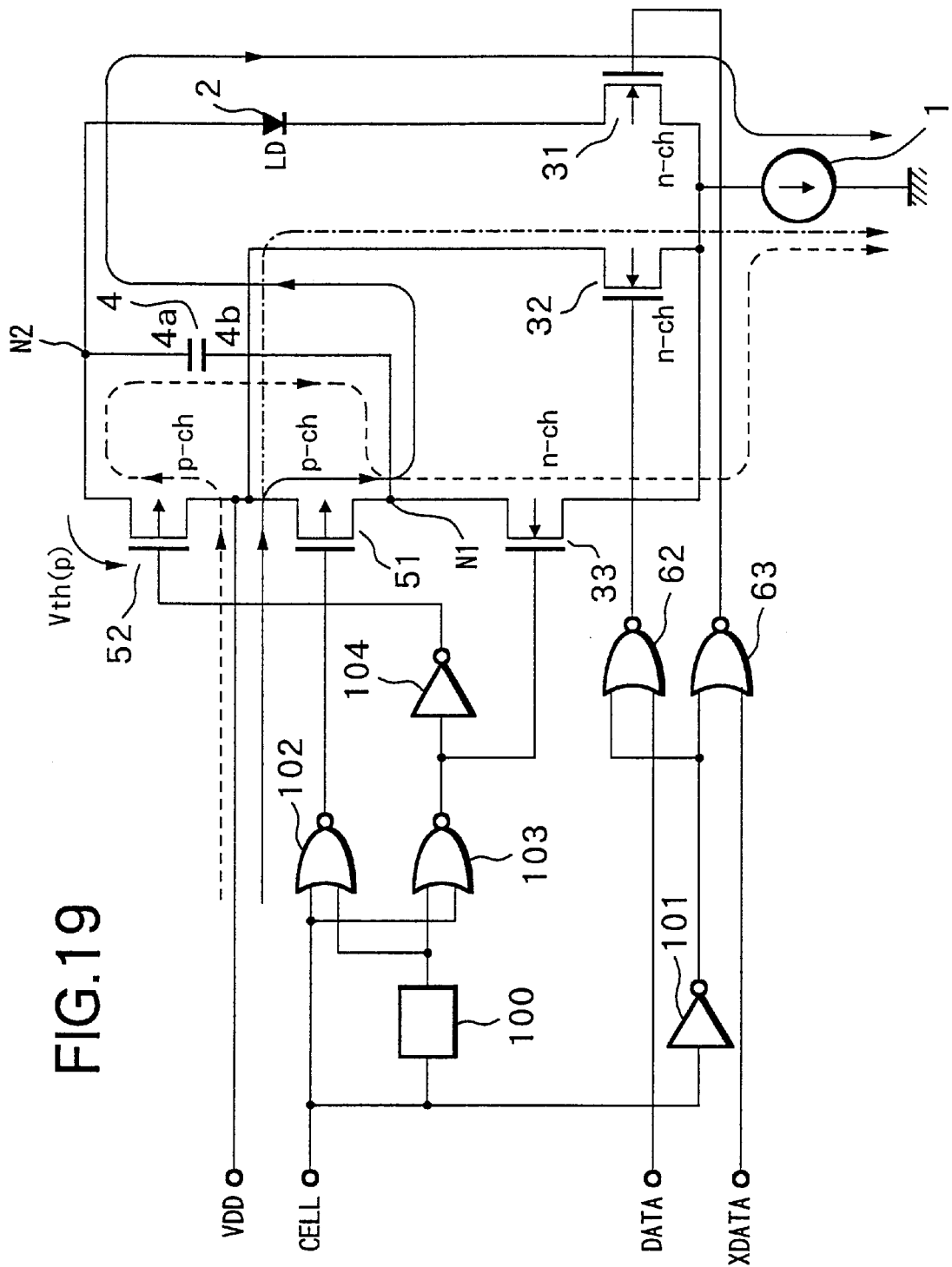
FIG. 19 is a view showing a constitution of a light emitting element driving circuit according to a sixth embodiment of the present invention.

FIG. 19 is a view showing a constitution of such a light emitting element driving circuit according to the sixth embodiment.

The circuit shown in FIG. 19 is provided by adding a sequence controlling circuit constituted of a delay circuit 100, inverters 101, 104, a NAND gate 102 and a NOR gate 103, such as in the aforementioned circuitry shown in FIG. 8.

Figure 20:
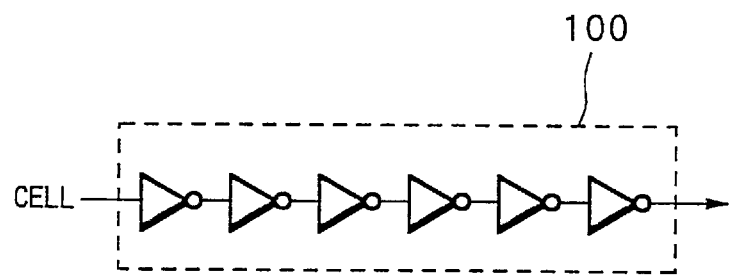
FIG. 20 is a view showing a concrete example of a delay circuit concerning the sixth embodiment.

The delay circuit 100 delays the input cell signal CELL by a predetermined period of time by means of a plurality of inverters such as shown in FIG. 20, to thereby output the delayed signal CELL to the NAND gate 102 and NOR gate 103. The NAND gate 102 calculates the negation of the logical product of the output signal from the delay circuit 100 and the cell signal CELL itself, and supplies a signal indicative of the calculation result to the gate terminal of the p-channel MOSFET 51. The NOR gate 103 calculates the negation of the logical sum of the output signal from the delay circuit 100 and the cell signal CELL itself, and supplies a signal indicative of the calculation result to the inverter 104 and to the gate terminal of the n-channel MOSFET 33. The inverter 104 inverts the output signal from the NOR gate 103 and supplies the inverted signal to the gate terminal of the p-channel MOSFET 52. The inverter 101 supplies the inverted cell signal CELL to the NOR gates 62, 63.

Figure 21:
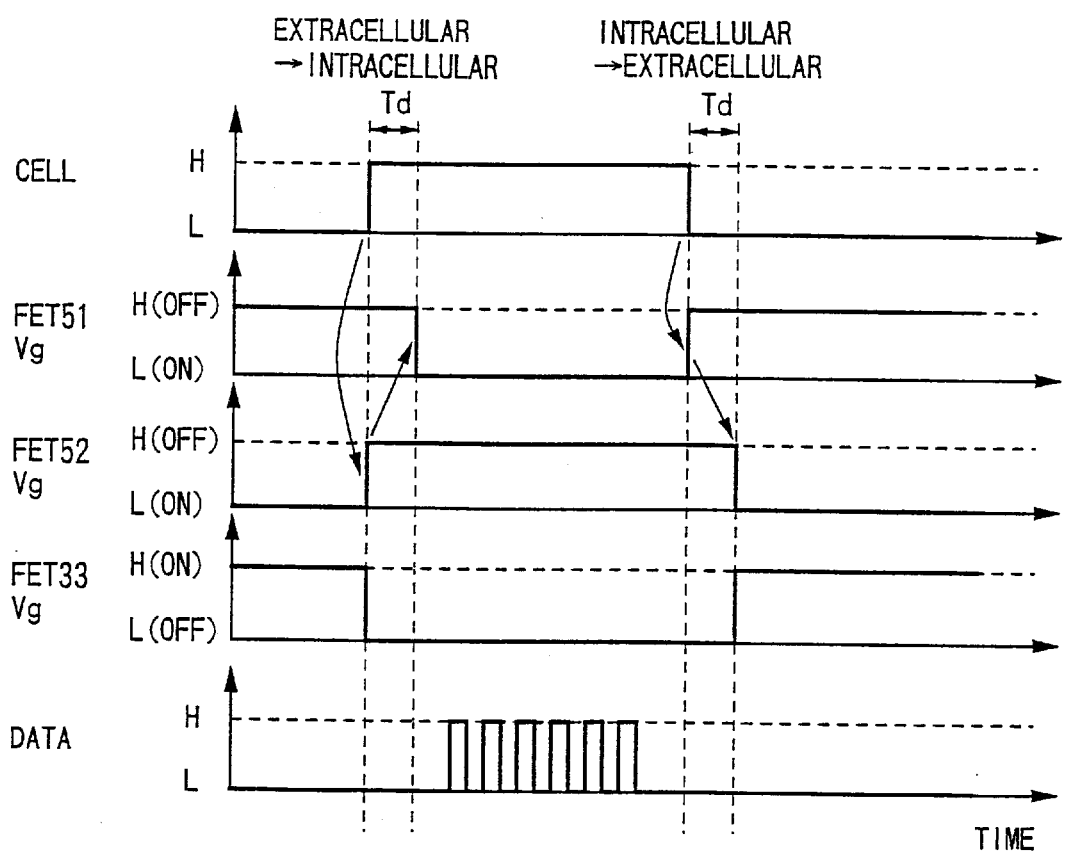
FIG. 21 is a time chart explaining sequence control in the sixth embodiment.
Figure 22:
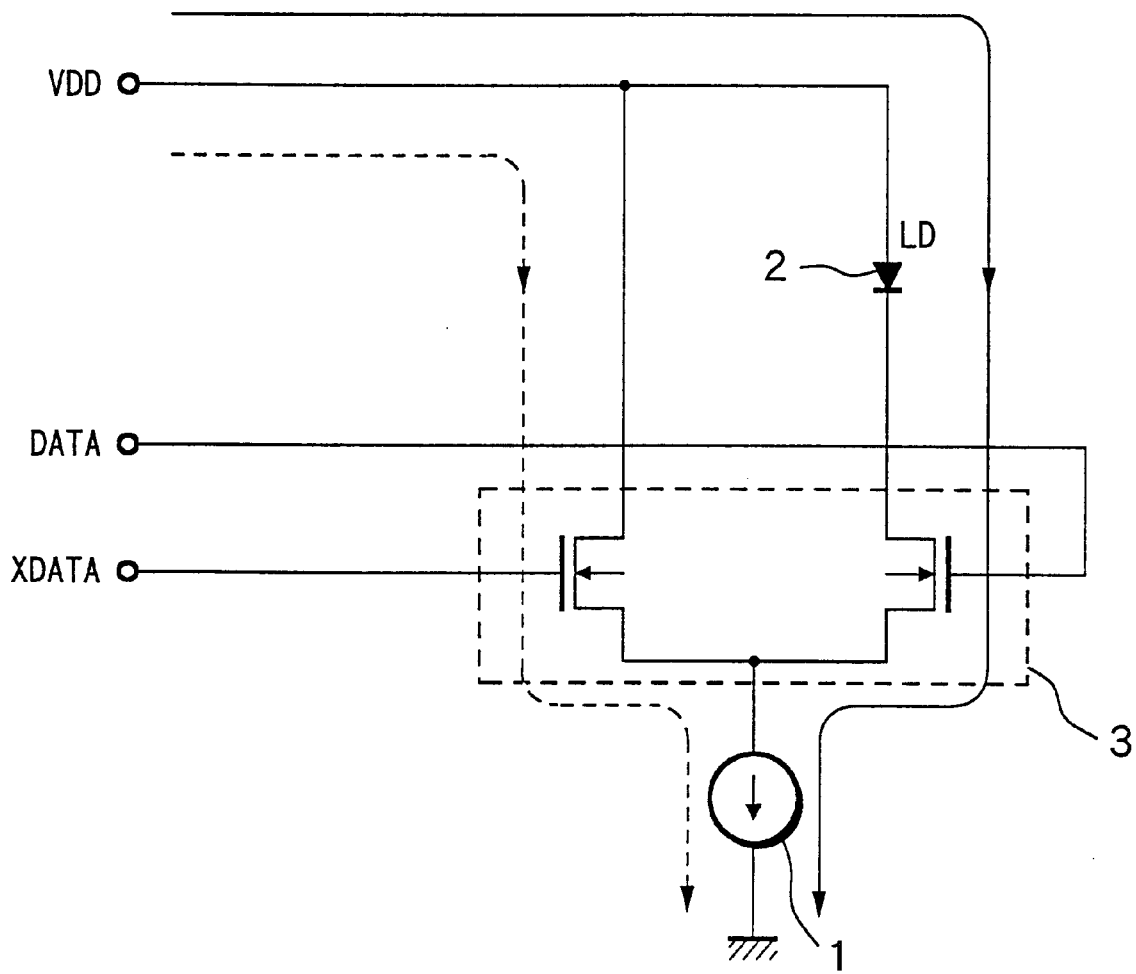
FIG. 22 is a view showing an exemplary constitution of a light emitting element driving circuit for typical high-speed optical communications.

There will be now concretely described the sequence control in the aforementioned circuitry, with reference to FIG. 21.

In FIG. 21, when the timing is to be firstly switched from extracellular to intracellular, switched from ON to OFF are the p-channel MOSFET 52 and n-channel MOSFET 33 which are the switches for the charging path for charging the capacitor 4. At this time, the p-channel MOSFET 51 acting as the switch for the boosting path is kept OFF. There is thus realized a situation where the respective switches for the charging path and boosting path are once turned off simultaneously. Further, after a lapse of delay time Td by the delay circuit 100, the p-channel MOSFET 51 is switched from OFF to ON, to thereby complete the switching from extracellular to intracellular.

On the other hand, the switching operation from intracellular to extracellular is conducted in the sequence opposite to the above. Namely, the p-channel MOSFET 51 acting as the switch for the boosting path is switched from ON to OFF, so as to charge the capacitor 4. At this time, the p-channel MOSFET 52 and n-channel MOSFET 33 acting as the switches for the charging path are kept OFF. There is thus realized a situation where the respective switches for the charging path and boosting path are once turned off simultaneously. Further, after a lapse of delay time Td by the delay circuit 100, the p-channel MOSFET 52 and n-channel MOSFET 33 are switched from OFF to ON, to thereby complete the switching from intracellular to extracellular.

According to the sixth embodiment as described above, since the switching of electric current paths for charging and boosting (discharging) are sequence controlled so as to avoid the short-circuit between opposite terminals of the capacitor 4 when switching the electric current paths, there can be avoided the deterioration of the voltage transforming efficiency to thereby boost the supply voltage more reliably.

The aforementioned first through sixth embodiments have been constituted so that the single step of boosting is conducted such as based on the data signal DATA at a HIGH level designating light emission and the cell signal at a HIGH level indicative of the presence of cells including burst data. However, it is obvious to provide such a constitution in a plurality of boosting steps to thereby enable generation of a higher voltage.

What we claimed are:

1. A light emitting element driving circuit for driving a light emitting element by a constant electric current generated by an electric current source, comprising:

a first switching part for switching a portion of a path for an electric current flowing into said electric current source, to one of a light emission path including said light emitting element and a light extinction path excluding said light emitting element, in accordance with a data signal for determining whether said light emitting element is to be driven for light emission;

a supply voltage boosting part for boosting a supply voltage based on a charge accumulated by the supply of the supply voltage;

a second switching part for switching another portion of said path for an electric current flowing into said electric current source, to one of a charging path for charging said supply voltage boosting part and a boosting path for applying the supply voltage boosted by said supply voltage boosting part to said light emitting element, in accordance with a control signal corresponding to said data signal.

2. A light emitting element driving circuit of claim 1, wherein said supply voltage boosting part includes a capacitor having a first terminal and a second terminal; and wherein when the switching to said charging path is conducted, said second switching part applies said supply voltage to said first terminal of said capacitor and connects said second terminal of said capacitor to a path leading to said supply voltage, and when the switching to said boosting path is conducted, said second switching part applies said supply voltage to said second terminal of said capacitor and connects said first terminal of said capacitor to said light emitting element.

3. A light emitting element driving circuit of claim 2, wherein said control signal is common to said data signal;

wherein when said data signal is at a logic to bring said light emitting element into a light extinction state, said switching operations of said first switching part and said second switching part are to form a path of an electric current flowing through said first terminal of said capacitor applied with said supply voltage, said second terminal of said capacitor and said electric current source, in this order, to thereby charge said capacitor; and wherein when said data signal is at a logic to bring said light emitting element into a light emission state, said switching operations of said first switching part and said second switching part are to form a path of an electric current flowing through said second terminal of said capacitor applied with said supply voltage, said first terminal of said capacitor, said light emitting element and said electric current source, in this order, to thereby drive said light emitting element by the boosted supply voltage.

4. A light emitting element driving circuit of claim 2, wherein said control signal is a cell signal indicative of whether said data signal is at an intracellular timing including logics for bringing said light emitting element into a light emission state, or at an extracellular timing;

wherein when said cell signal is at a logic indicative of an extracellular timing, said switching operations of said first switching part and said second switching part are to form a path of an electric current flowing through said first terminal of said capacitor applied with said supply voltage, said second terminal of said capacitor and said electric current source, in this order, to thereby charge said capacitor; and wherein when said cell signal is at a logic indicative of an intracellular timing and said data signal is at a logic to bring said light emitting element into a light emission state, said switching operations of said first switching part and said second switching part are to form a path of an electric current flowing through said second terminal of said capacitor applied with said supply voltage, said first terminal of said capacitor, said light emitting element and said electric current source, in this order, to thereby drive said light emitting element by the boosted supply voltage.

5. A light emitting element driving circuit of claim 4, wherein when said cell signal is at a logic indicative of an intracellular timing and said data signal is at a logic to bring said light emitting element into a light extinction state, said switching operations of said first switching part and said second switching part form a path of an electric current excluding said capacitor and said light emitting element.

6. A light emitting element driving circuit of claim 4, further comprising:

a data detecting part for detecting whether said data signal within a finite length includes a logic to bring said light emitting element into a light emission state; and wherein the detection result of said data detecting part is used as said cell signal.

7. A light emitting element driving circuit of claim 4, wherein said control signal comprises a signal based on a clock signal synchronized with said data signal and said cell signal;

wherein said light emitting element driving circuit further comprises a rectifying part for rectifying said supply voltage boosted by said capacitor and for applying the thus boosted supply voltage to said light emitting element;

wherein when said cell signal is at a logic indicative of an extracellular timing and said signal based on said clock signal is at one of two indicatable logics, said switching operations of said first switching part and said second switching part are to form a path of an electric current flowing through said first terminal of said capacitor applied with said supply voltage, said second terminal of said capacitor and said electric current source, in this order, to thereby charge said capacitor;

wherein when said cell signal is at a logic indicative of an extracellular timing and said signal based on said clock signal is at the other of two indicatable logics, said switching operations of said first switching part and said second switching part are to form a path of an electric current flowing through said second terminal of said capacitor applied with said supply voltage, said first terminal of said capacitor and said rectifying part, in this order; and wherein when said cell signal is at a logic indicative of an intracellular timing and said data signal is at a logic to bring said light emitting element into a light emission state, said switching operations of said first switching part and said second switching part are to form a path of an electric current flowing through said rectifying part, said light emitting element and said electric current source, in this order, to thereby drive said light emitting element by the voltage rectified by said rectifying part.

8. A light emitting element driving circuit of claim 1, further comprising:

a sequence controlling part for controlling the operation of said second switching part such that said supply voltage to said supply voltage boosting part is momentarily interrupted when switching between said charging path and said boosting path at said second switching part.

* * * * *